United States Patent
Tinnakornsrisuphap et al.

(10) Patent No.: US 8,611,921 B2
(45) Date of Patent: Dec. 17, 2013

(54) DELAY AND BACKHAUL-EFFICIENT PAGING METHOD AND APPARATUS

(75) Inventors: Peerapol Tinnakornsrisuphap, San Diego, CA (US); Fatih Ulupinar, San Diego, CA (US); Parag Arun Agashe, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1175 days.

(21) Appl. No.: 12/098,223

(22) Filed: Apr. 4, 2008

(65) Prior Publication Data

US 2008/0274751 A1   Nov. 6, 2008

Related U.S. Application Data

(60) Provisional application No. 60/910,594, filed on Apr. 6, 2007, provisional application No. 60/942,392, filed on Jun. 6, 2007.

(51) Int. Cl.
*H04W 24/00* (2009.01)

(52) U.S. Cl.
USPC .................................... 455/456.1; 455/458

(58) Field of Classification Search
USPC ............... 455/456.1–458, 440–441, 417–423
See application file for complete search history.

(56) References Cited

U.S. PATENT DOCUMENTS

| | | | |
|---|---|---|---|
| 5,953,667 A * | 9/1999 | Kauppi | 455/440 |
| 6,223,044 B1 | 4/2001 | Schultz | |
| 6,292,667 B1 * | 9/2001 | Wallentin et al. | 455/458 |
| 6,873,854 B2 | 3/2005 | Crockett et al. | |
| 7,120,453 B2 | 10/2006 | La Porta et al. | |
| 2002/0046287 A1 * | 4/2002 | La Porta et al. | 709/230 |
| 2002/0046289 A1 | 4/2002 | Venkaraman et al. | |
| 2002/0193106 A1 * | 12/2002 | Koo et al. | 455/423 |
| 2011/0105118 A1 | 5/2011 | Tinnakornsrisuphap et al. | |

FOREIGN PATENT DOCUMENTS

| | | |
|---|---|---|
| EP | 1484863 | 12/2004 |
| RU | 2107397 | 3/1998 |
| RU | 2004127452 A | 1/2008 |
| WO | 2006138573 | 12/2006 |

OTHER PUBLICATIONS

Partial International Search Report—PCT/US08/059598, International Search Authority—European Patent Office, Sep. 11, 1998.

(Continued)

*Primary Examiner* — Kashif Siddiqui
(74) *Attorney, Agent, or Firm* — S. Hossain Beladi

(57) ABSTRACT

Described herein is methodologies for efficient utilization of backhaul resources of a network for delivering paging data to an access terminal (AT) without sacrificing delay performance. A location that buffers data for an AT can be adaptively changed based on factors such as the location of the AT, applications utilized by the AT, and a recent activity level of the AT. To facilitate this determination, an AT can be configured with one or more registration boundaries. An AT can be configured with a small registration radius such that it the AT does not move outside of the small registration radius, data can be delivered directly to a data attachment point for the AT. If the AT moves outside of the small registration radius, the registration radius can be switched to a large registration radius and the access gateway can instead locally buffer data for the AT.

33 Claims, 25 Drawing Sheets

(56) References Cited

OTHER PUBLICATIONS

International Search Authority—PCT/US08/059598, International Search Authority—European Patent Office. Nov. 4, 2008.

Written Opinion—PCT/US08/059598, International Search Authority—European Patent Office, Nov. 4, 2008.
Taiwan Search Report—TW097112527—TIPO—Jan. 18, 2012.
European Search Report—EP11006258—Search Authority—Munich—Sep. 16, 2011.

* cited by examiner

DELAY AND BACKHAUL-EFFICIENT PAGING METHOD AND APPARATUS

CROSS-REFERENCE

This application claims the benefit of U.S. Provisional Application Ser. No. 60/910,594, filed Apr. 6, 2007, and entitled "DELAY AND BACKHAUL-EFFICIENT PAGING METHOD AND APPARATUS," and U.S. Provisional Application Ser. No. 60/942,392, filed Jun. 6, 2007, and entitled "IDLE STATE MOBILITY MANAGEMENT AND PAGING CALL FLOWS," the entirety of which are incorporated herein by reference.

BACKGROUND

I. Field

The present disclosure relates generally to wireless communications, and more specifically to techniques for paging and data buffering in a wireless communication system.

II. Background

Wireless communication systems are widely deployed to provide various communication services; for instance, voice, video, packet data, broadcast, and messaging services may be provided via such wireless communication systems. These systems may be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Such wireless communication systems can be utilized to implement, for example, a wireless wide area network (WAN) data network. In such a network, a paging procedure is utilized to initiate communication of data from an access gateway (AGW) to an access terminal (AT) through a data attachment point (DAP), which can be an access network associated with the access terminal. During the, paging procedure, data to be communicated to the access terminal is buffered by an entity in the network.

Conventional approaches to data buffering and paging in wireless WAN data networks often result in inefficiency due to delay and/or overuse of backhaul resources. In one such conventional approach, data is buffered at a DAP during paging of an access terminal. However, if the access terminal is not within the coverage area of the DAP, the DAP typically must tunnel the data to an access network that serves the access terminal, which results in delays. and significant increases in the amount of backhaul resources utilized. In another conventional approach, the access gateway is used to trigger paging of an access terminal and to buffer data during paging. Under this approach, however, backhaul resources must be utilized to regularly inform the access gateway of the state of the access terminal. Further, unnecessary delays may be introduced if the access terminal remains within the coverage area of a DAP.

Accordingly, there is a need for techniques that minimize delay and required backhaul resources associated with paging and data buffering in a wireless communication system.

SUMMARY

The following presents a simplified summary of the disclosed embodiments in order to provide a basic understanding of such embodiments. This summary is not an extensive overview of all contemplated embodiments, and is intended to neither identify key or critical elements nor delineate the scope of such embodiments. Its sole purpose is to present some concepts of the disclosed embodiments in a simplified form as a prelude to the more detailed description that is presented later.

In accordance with one aspect, a method for data buffering and paging in a wireless communication system is described herein. The method can comprise determining a location of an access terminal. Further, the method can comprise adaptively changing an entity that buffers data for the access terminal based at least in part on the location of the access terminal.

Another aspect relates to a wireless communications apparatus that can comprise a memory that stores data relating to a terminal for which the wireless communications apparatus serves as a data attachment point. The wireless communications apparatus can further comprise a processor configured to determine a location of the terminal and to adaptively change an entity that buffers data for the terminal based on the location of the terminal.

Yet another aspect relates to an apparatus that facilitates delay and backhaul-efficient paging and data communication in a wireless communication system. The apparatus can comprise means for determining whether a mobile terminal has moved away from a data attachment point coverage area. Further, the apparatus can include means for selecting a location for buffering data for the mobile terminal based at least in part on the determination.

Still another aspect relates to a computer-readable medium that can comprise code for causing a computer to determine a location of a terminal in an idle state. The computer-readable medium can additionally comprise code for causing a computer to determine a location for buffering data for the terminal based on the determined location of the terminal. Further, the computer-readable medium can include code for causing a computer to cause the terminal to enter an active state. The computer-readable medium can also include code for causing a computer to deliver buffered data to the terminal.

In accordance with another aspect, an integrated circuit is described herein that can execute computer-executable instructions for coordinating communication of data to an access terminal in a wireless data network. The instructions can comprise determining whether an access terminal is associated with a first registration radius associated with a first coverage area or a second registration radius associated with a second coverage area. In addition, the instructions can include modifying a location that buffers data for the access terminal hayed on the determined registration radius associated with the access terminal.

In accordance with yet another aspect, a method for coordinating communication based on position in a wireless communication system is described herein. The method can comprise associating with a first registration radius corresponding to a coverage area for a first access network. In addition, the method can include monitoring position relative to the first registration radius. The method can further include, upon a determination that the monitored position has moved away from the first registration radius, communicating a registration signal to a second access network and associating with a second registration radius corresponding to a coverage area for at least the first access network and the second access network.

Another aspect relates to a wireless communications apparatus that can comprise a memory that stores data relating to a current position of the wireless communications apparatus, a small registration radius corresponding to the coverage area of a first access point, and a large registration radius corresponding to the coverage area of the first access point and at least a second access point. The wireless communications apparatus can further comprise a processor configured to determine whether the current position of the wireless communications apparatus has moved away from the small registration radius and to register the wireless communications apparatus and switch a registration radius used by the wireless communications apparatus from the small registration radius to the large registration radius upon a positive determination.

Yet another aspect relates to an apparatus that facilitates reporting position of an associated device in a wireless data network. The apparatus can comprise means for determining position of an associated device relative to a coverage area of an associated data attachment point. In addition, the apparatus can comprise means for registering the associated device upon determining that the associated device has moved away from the coverage area of the associated data attachment point.

Still another aspect relates to a computer-readable medium that can comprise code for causing a computer to associate with a registration boundary. The computer-readable medium can also include code for causing a computer to track movement in relation to the registration boundary. Further, the computer-readable medium can comprise code for causing a computer to communicate a registration signal upon tracking movement from inside the registration boundary to outside the registration boundary.

An additional aspect relates to an integrated circuit that can execute computer-executable instructions for communicating in a wireless data network. These instructions can comprise monitoring movements within a small registration boundary associated with a first base station and a large registration boundary associated with a first base station and at least a second base station. In addition, the instructions can include registering with a network controller upon monitoring a movement from inside the small registration boundary to outside the small registration boundary. The instructions can further comprise receiving data from an access gateway through one of the first base station and the second base station based at least in part on the monitored movements.

To the accomplishment of the foregoing and related ends, one or more embodiments comprise the features hereinafter fully described and particularly pointed out in the claims. The following description and the annexed drawings set forth in detail certain illustrative aspects of the disclosed embodiments. These aspects are indicative, however, of but a few of the various ways in which the principles of various embodiments may be employed. Further, the disclosed embodiments are intended to include all such aspects and their equivalents.

DETAILED DESCRIPTION

Figure 1:
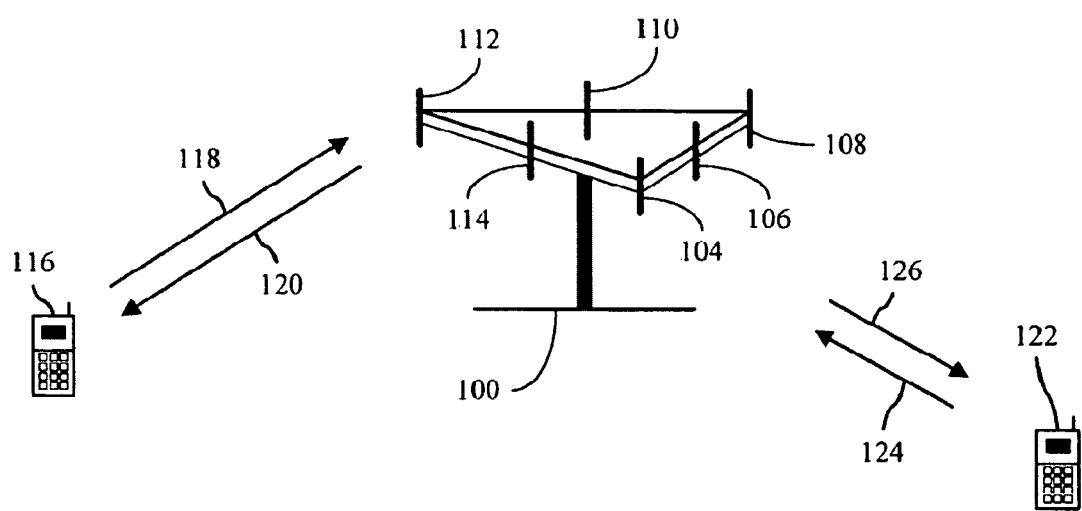
FIG. 1 illustrates a wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution.

For example, a component may be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal and/or a base station. A wireless terminal may refer to a device providing voice and/or data connectivity to a user. A wireless terminal may be connected to a computing device such as a laptop computer or desktop computer, or it may be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal may be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) may refer to a device in an access network that communicates over the air-interface, through one or more sectors, with wireless terminals. The base station may act as a router between the wireless terminal and the rest of the access network, which may include an Internet Protocol (IP) network, by converting received air-interface frames to IP packets. The base station also coordinates management of attributes for the air interface.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to the drawings, FIG. 1 is an illustration of a wireless multiple-access communication system in accordance with various aspects. In one example, an access point 100 (AP) includes multiple antenna groups. As illustrated in FIG. 1, one antenna group can include antennas 104 and 106, another can include antennas 108 and 110, and another can include antennas 112 and 114. While only two antennas are shown in FIG. 1 for each antenna group, it should he appreciated that more or fewer antennas may be utilized for each antenna group. In another example, an access terminal 116 (AT) can be in communication with antennas 112 and 114, where antennas 112 and 114 transmit information to access terminal 116 over forward link 120 and receive information from access terminal 116 over reverse link 118. Additionally and/or alternatively, access terminal 122 can be in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 can use different frequency for communication. For example, forward link 120 may use a different frequency then that used by reverse link 118.

Each group of antennas and/or the area in which they are designed to communicate can be referred to as a sector of the access point. In accordance with one aspect, antenna groups c(an be designed to communicate to access terminals in a sector of areas covered by access point 100. In communication over forward links 120 and 126, the transmitting antennas of access point 100 can utilize beamforming in order to improve die signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point, e.g., access point 100, can be a fixed station used for communicating with terminals and can also be referred to as a base station, an evolved base station (eBS), a Node B, an access network, and/or other suitable terminology. In addition, an access terminal (AT), e.g., an access terminal 116 or 122, can also be referred to as a mobile terminal, user equipment (UE), a wireless communication device, a terminal, a wireless terminal, and/or other appropriate terminology.

Figure 2:
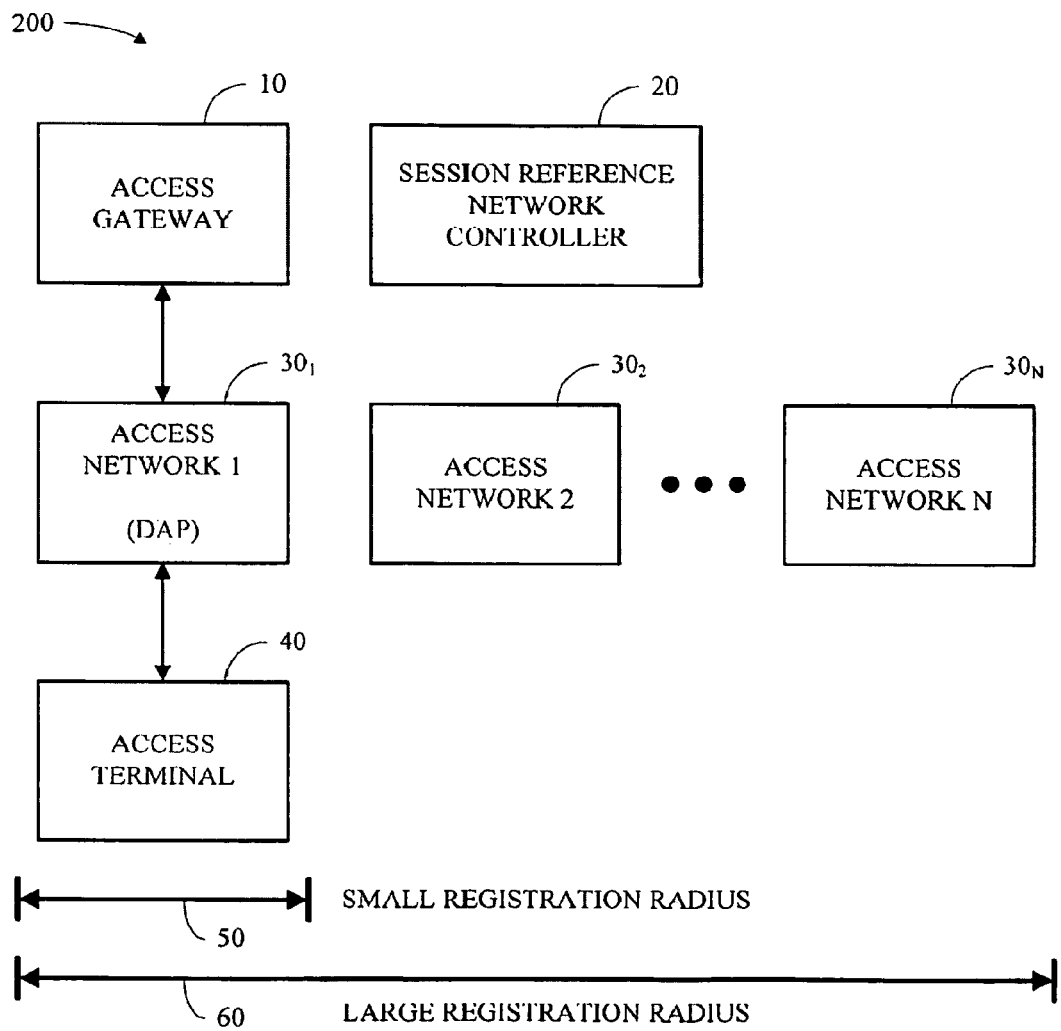
FIG. 2 is a block diagram of a system that facilitates paging and data buffering in accordance with various aspects.

FIG. 2 is a block diagram of a system 200 that facilitates paging and data buffering in accordance with various aspects described herein. System 200 can be utilized in wireless WAN data networking applications and/or other suitable wireless communication applications. In accordance with one aspect, system 200 can include an access gateway (AGW) 10. AGW 10 can receive data from a data source, such as the Internet and/or another suitable data source, for communication to an access terminal (AT) 40. Data received by AGW and communicated to an access terminal 40 can be encapsulated in one or more packets and/or organized in any other appropriate manner. System 200 can also include one or more access networks (AN) 30 that can communicate data and/or control signaling to one or more access terminals 40 on forward and reverse links. In one example, an access network 30 or another suitable network entity can be designated a data attachment point (DAP) for an access terminal 40. An access network 30 or other entity designated as the DAP for an access terminal 40 can have tunnel binding with an AGW 10 such that, for example, the AGW 10 forwards data for the access terminal 40 to the designated DAP. Additionally and/or alternatively, a DAP for an access terminal 40 can receive one or more data notification messages from AGW 10 in the event that AGW 10 has been designated to buffer data for access terminal 40. Techniques that can be used for determining whether AGW 10 buffers or forwards data are described in more detail infra. As illustrated in system 200, access network $30_1$ is the designated DAP for access terminal 40. However, it should be appreciated that a DAP for an access terminal 40 need not be an access network 30 and need not have radio connectivity with the access terminal 40.

In another example, system 200 can include a session reference network controller (SRNC) 20 that can store paging area, databases and configuration information for one or more access terminals 40. Configuration information stored by SRNC 20 clan include information relating to registration boundaries (e.g., registration radii 50-60) and paging cycles to be used with respective access terminals 40. SRNC 20 can be located at AGW 10, at an access network 30, at a stand-alone entity in system 200, and/or at any other suitable location in system 200.

In accordance with another aspect, a paging procedure can be triggered in system 200 to facilitate communication of data to an access terminal 40 that has entered an idle state. In one example, an access terminal 40 can enter an idle state when an active airlink connection of the terminal is closed in order to save terminal power, battery life, and/or other resources of the terminal, as well as resources of one or more access networks that would otherwise be used. to communicate with the terminal. When an access terminal 40 enters an idle state, the access terminal 40 may he unable to engage in regular communication with access networks 30 and/or other entities in system 200. By way of example, an access terminal 40 in an idle state may not have any resources assigned for communication in system 200. Thus, in the event that data arrives at AGW 10 for an idle access terminal 40, a paging procedure can be initiated to cause the access terminal 40 to re-enter an active state for receiving the data.

During a paging procedure performed in system 200, data to be communicated to an idle access terminal 40 can be buffered pending successful completion of the paging procedure. Thus, in order for system 200 to operate efficiently during paging, a determination must be made in system 200 as to which entity in system 200 should buffer the data for the access terminal 40 while paging is in progress. Further, a determination must be made as to which entity in system 200 should be responsible for triggering the paging procedure in the access network 30.

One conventional solution. to these determinations is to always communicate data to a designated DAP for an access terminal 40 and to let AGW 10 be agnostic to the status of the access terminal 40. However, if the access terminal 40 has moved away from the coverage of the DAP, then it is likely that the data will need to be tunneled again from DAP to another access network 30 that found the access terminal 40. If the amount of data to be communicated to the access terminal 40 is large, then this re-tunneling can consume more backhaul resources than what would be consumed if the data were buffered at AGW 10 and then directly tunneled to the access network 30 that found the access terminal 40. Moreover, access networks 30 are often not capable of directly communicating with each other, and as a result tunneling a large amount of data from one access network 30 to another is likely to take longer than tunneling data from AGW 10 to an access network 30.

Another conventional solution to the above determinations is to always. buffer data and trigger paging from AGW 10. However, in this case, AGW 10 is required to be informed of each active/idle state transition of an access terminal 40, which can be very frequent (e.g., during read time between web page requests). Further, race conditions can exist where, fur example, AGW 10 is not yet aware that an access terminal 40 is idle but has nonetheless sent data to a DAP designated for the access terminal 40. In addition, this conventional solution can introduce unnecessary delay if an access terminal 40 remains within the coverage area of a DAP.

In accordance with one aspect, to mitigate the inefficiencies associated with these and other conventional approaches, system 200 can utilize paging techniques that efficiently utilize network backhaul resources (e.g., resources between an access network 30 and AGW 10) for delivering paging data from AGW 10 to an access terminal 40 without sacrificing delay performance by adaptively changing an entity in system 200 that buffers data for an access terminal 40 depending on the location of the access terminal 40.

In one example, an access terminal 40 can be configured with a small registration radius 50. The small registration radius 50 can correspond to, for example, the coverage area of an access network 30 designated as the DAP for the access terminal 40. Further, a small registration radius 50 for an access terminal 4U can operate such that, if the access terminal 40 does not move outside of the coverage area of a DAP, then data from AGW 10 can be delivered directly to the DAP without requiring AGW 10 to be aware of the state of the access terminal 40. By doing so, delays associated with delivering data from AGW 10 to an access terminal 40 can be minimized by eliminating the need for AGW 10 and an access network 30 to communicate regarding the status of an access terminal 40 prior to communication of data. Further, it should be appreciated that because data tunneling from AGW 10 to an access network 30 would be required in any event to deliver data to an access terminal 40, no additional backhaul communication is required. Further, it can be observed that delays could be further reduced by implementing SRNC 20 in an access network 30 designated as a DAP for an access terminal 40.

In another example, an access terminal 40 can also be configured with a large registration radius 60, which can be utilized when the access terminal 40 moves outside of the small registration radius 50. In one example, if an access terminal 40 moves outside of a small registration radius 50 but remains inside a large registration radius 60, it can, be required to register with a new access network 30. The access terminal 40 can then utilize the large registration radius 60 in place of the small registration radius 50. When this happens, the designated DAP for the access terminal 40 can stop the flow of data from AGW 10. Subsequently, if data arrives at AGW 10, AGW 10 can notify the DAP that it has data for the access terminal 40 so that the DAP can initiate a paging process. As a result of the paging process, any access network 30 that finds the access terminal 40 can establish a data tunnel with AGW 10. Thus, data flow can be enabled between AGW 10 and the access network 30 that found the access terminal 40 such that the access network 30 can deliver data to the access terminal 40. In one example, a small registration radius 50 and/or a large registration radius 60 associated with an access terminal 40 can be stored by SRNC 20, the access terminal 40, and/or another suitable entity in system 200.

In accordance with one aspect, a small registration radius 50 and a large registration radius 60 can be utilized in combination with one or more techniques for data buffering and paging as described infra to obtain an optimal tradeoff between delay and backhaul efficiency based on an application running at an access terminal 40. For example, when an access terminal 40 is running a delay-sensitive application, such as a push-to-talk application, system 200 can be adaptively configured to minimize the delay experienced by the access terminal 40. Conversely, when an access terminal 40 is running an application that is less sensitive to delay, system 200 can instead be configured to reduce the amount of backhaul resources required for communication.

In accordance with another aspect, by utilizing one or more techniques described infra, data communicated in system 200 can be configured to traverse only one backhaul link regardless of the location of an access terminal 40, thus minimizing the use of backhaul capacity. Further, when an access terminal 40 is within the coverage area of a DAP and has frequent active/idle transitions, communication can be conducted in system 200 without requiring signaling messages to AGW 10, thereby allowing data to be delivered to the access terminal 40 quickly and minimizing delay before data can be delivered to the access terminal 40. In one example, system 200 can reduce overall system design complexity and allow applications that utilize system 200 to be implemented more easily and effectively. For example, system 200 can utilize a unified page trigger procedure such that an access network 30 designated as a DAP for an access terminal 40 is responsible for triggering paging with SRNC 20 in all scenarios. Further, system 200 can provide coarse flow-control mechanisms between an access gateway 10 and access networks 30 that can be used for multiple purposes.

Figure 3A:
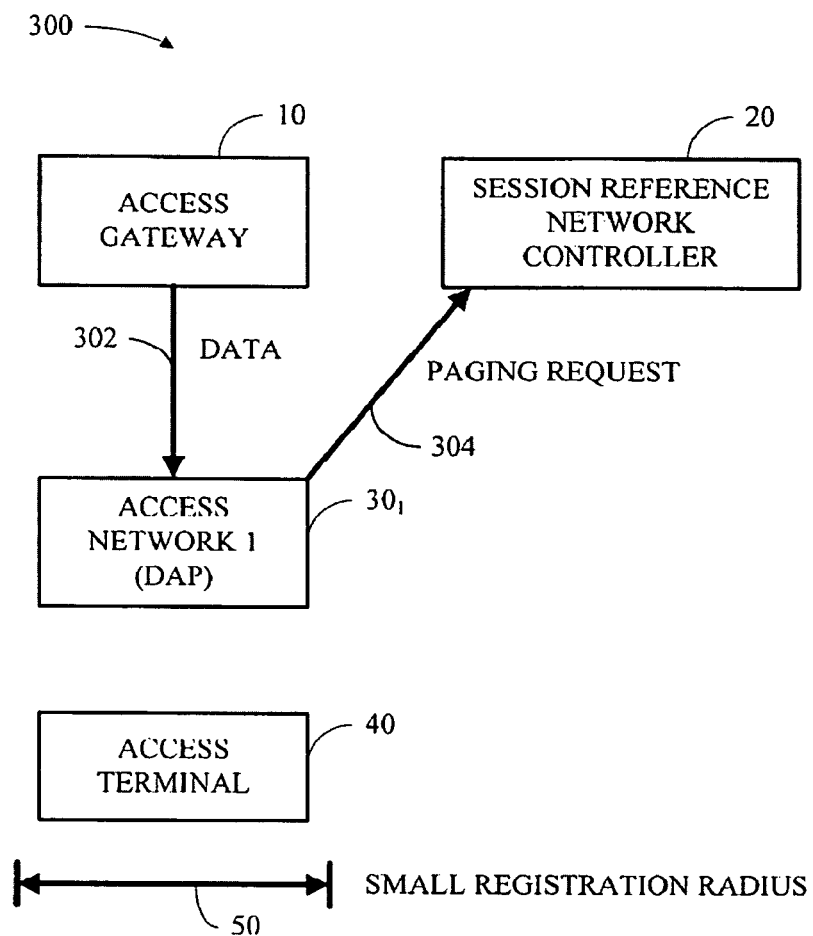
FIGS. 3A-3B illustrate operation of an example system for paging and data buffering based on a location of a terminal in accordance with various aspects.
Figure 3B:
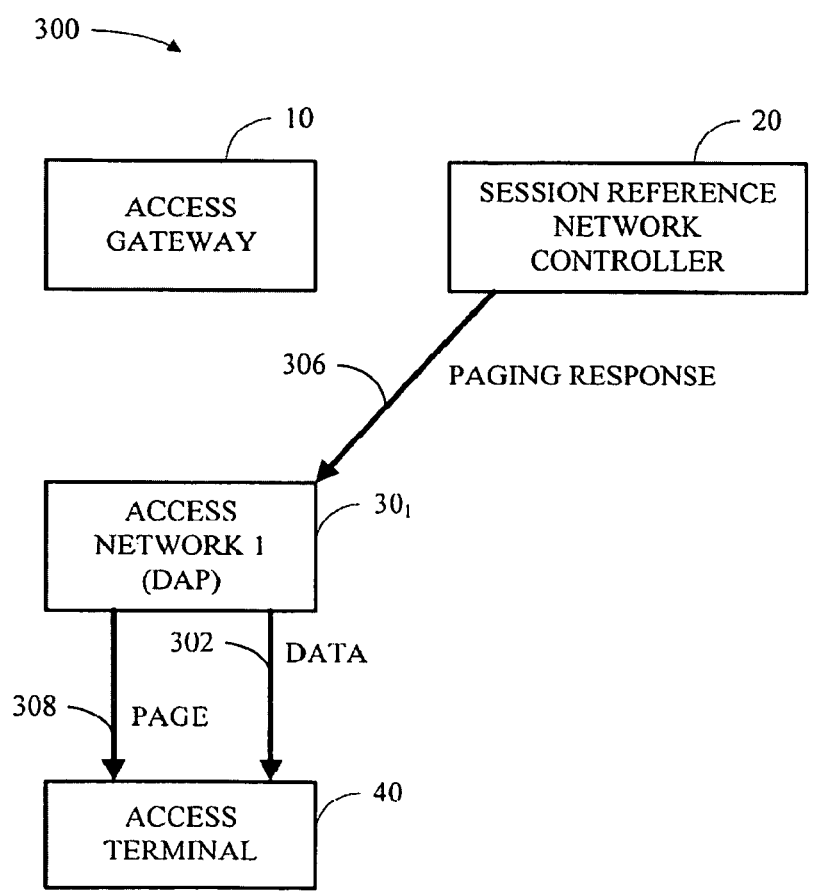

FIGS. 3A-3B illustrate operation of an example system 300 for paging and data buffering based on a location of an access terminal 40 in accordance with various aspects. In one example, system 300 can include an AGW 10, which can receive data 302 for communication to an access terminal 40. System 300 can further include an access network 30. designated as the DAP for access terminal 40, which can establish tunnel binding with AGW 10 such that AGW 10 can forward data 302 for access terminal 40 to access network 30. Access network 30 can further be in communication with an SRNC 20, which can provide configuration and registration boundary information for access terminal 40.

In accordance with one aspect, access terminal 40 can be located in system 300 within a small registration radius 50 corresponding to the coverage area of access network 30 and can be idle or otherwise not actively communicating in system 300. For example, the access terminal 40 may be located in a stationary position, such as the home or office of a user of the access terminal 40, and in an idle state in between periods of wireless activity in order to conserve resources and terminal battery life. In accordance with another aspect, by requiring access terminal 40 to register with an access network 30 in system 300 and/or SRNC 20 when it moves outside the small registration radius 50, it can be known within system 300 that access terminal 40 is within the coverage area of access network 30 even though access terminal 40 is not actively communicating with other entities in system 300 and may not have any resources assigned for communication. Accordingly, to provide data from AGW 10 to access terminal 40, a paging procedure can be utilized as illustrated by FIGS. 3A-3B.

Turning specifically to FIG. 3A, a paging procedure utilized by system 300 can begin by communicating data 302 for access terminal 40 or a data notification message indicating the presence of data 302 for access terminal 40 from AGW 10 to access network 30. As noted above, access terminal 40 can be configured to register with one or more entities in system 300 upon leaving a small registration radius 50 corresponding to the coverage area of access network 30. For this reason, if no registration from access terminal 40 is received within system 300, it can be assumed that access terminal 40 remains within the coverage area of access network 30. Accordingly, AGW 10 can communicate data 302 directly to access network 30 without requiring knowledge of the state of access terminal 40, thereby eliminating the need for extraneous signaling messages to AGW 10.

Upon receiving data 302 from AGW 10, access network 30 can initiate paging by communicating a paging request 304 to SRNC 20. After the paging request 304 is communicated, the paging procedure can continue as illustrated by FIG. 3B, wherein SRNC 20 can respond by communicating a paging response 306 to access network 30. Upon receiving the paging response 306 from SRNC 20, access network 30 can then send a paging signal 308 to access terminal 40. Once access terminal 40 receives the paging signal 308, access terminal 40 can subsequently establish a connection with access network 30. In accordance with one aspect, access network 30 can then utilize this connection to communicate the data 302 received from AGW 10 to access terminal 40.

Figure 4A:
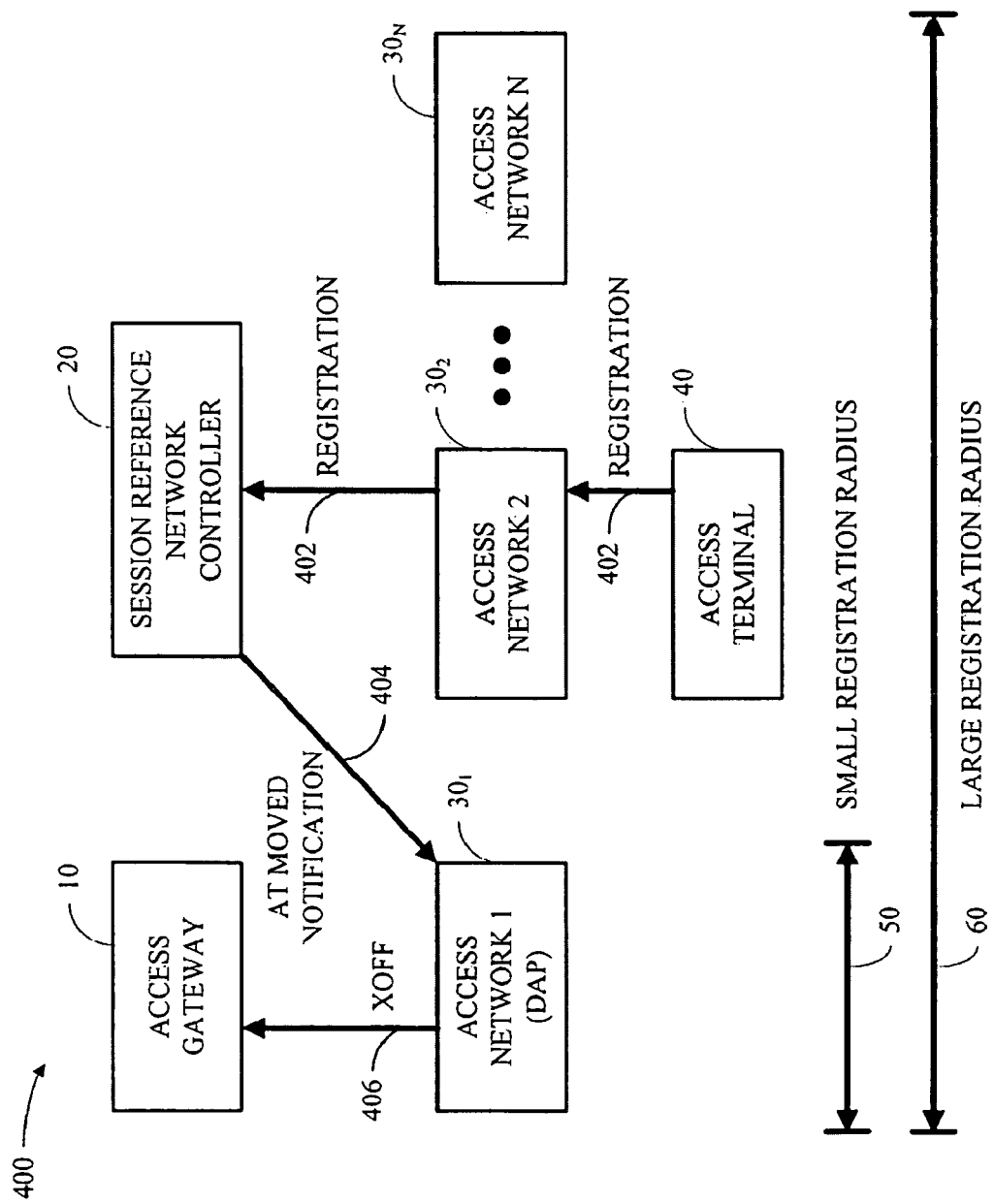
FIGS. 4A-4C illustrate operation of an example system for paging and data buffering based on a location of a terminal in accordance with various aspects.
Figure 4B:
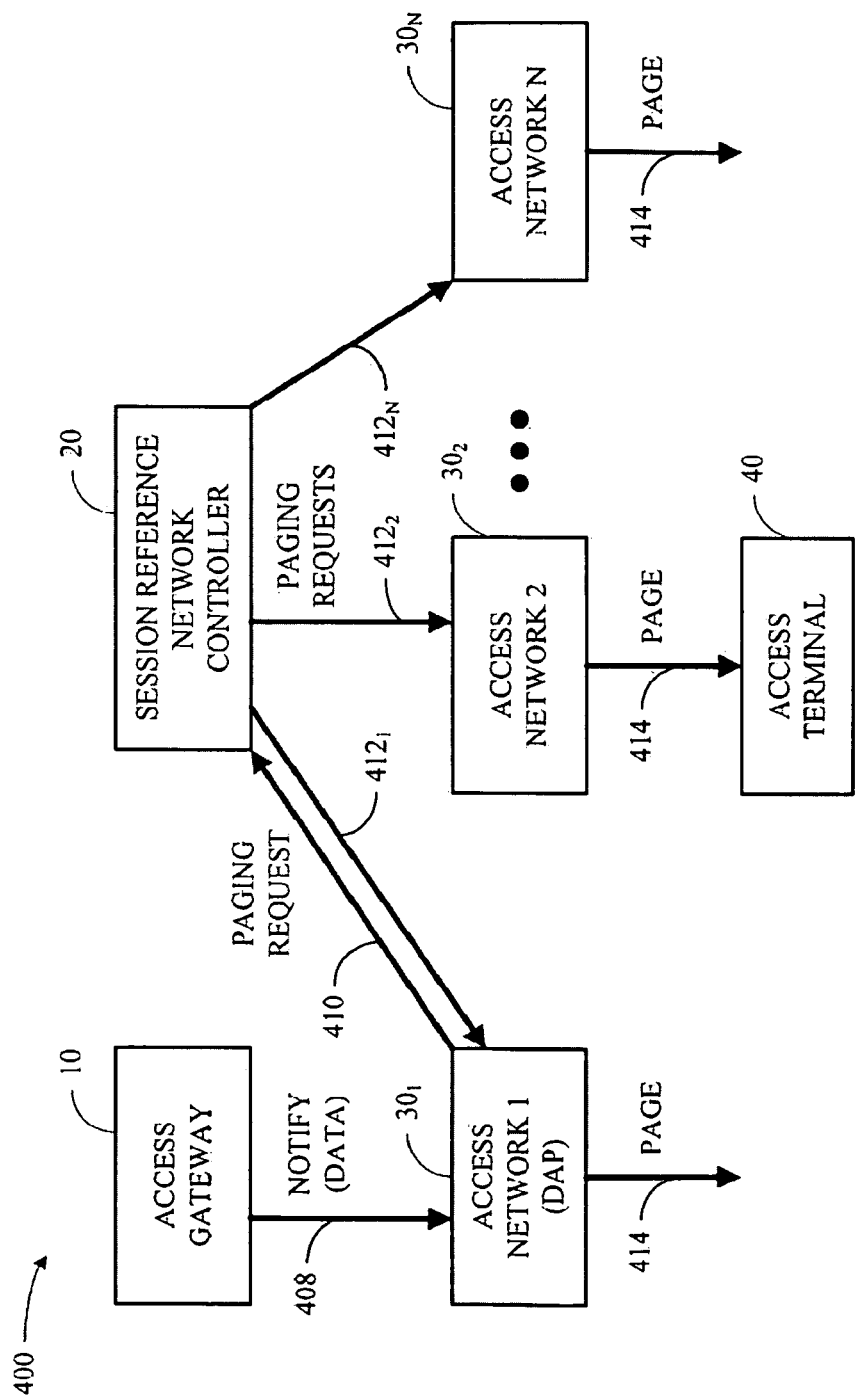
Figure 4C:
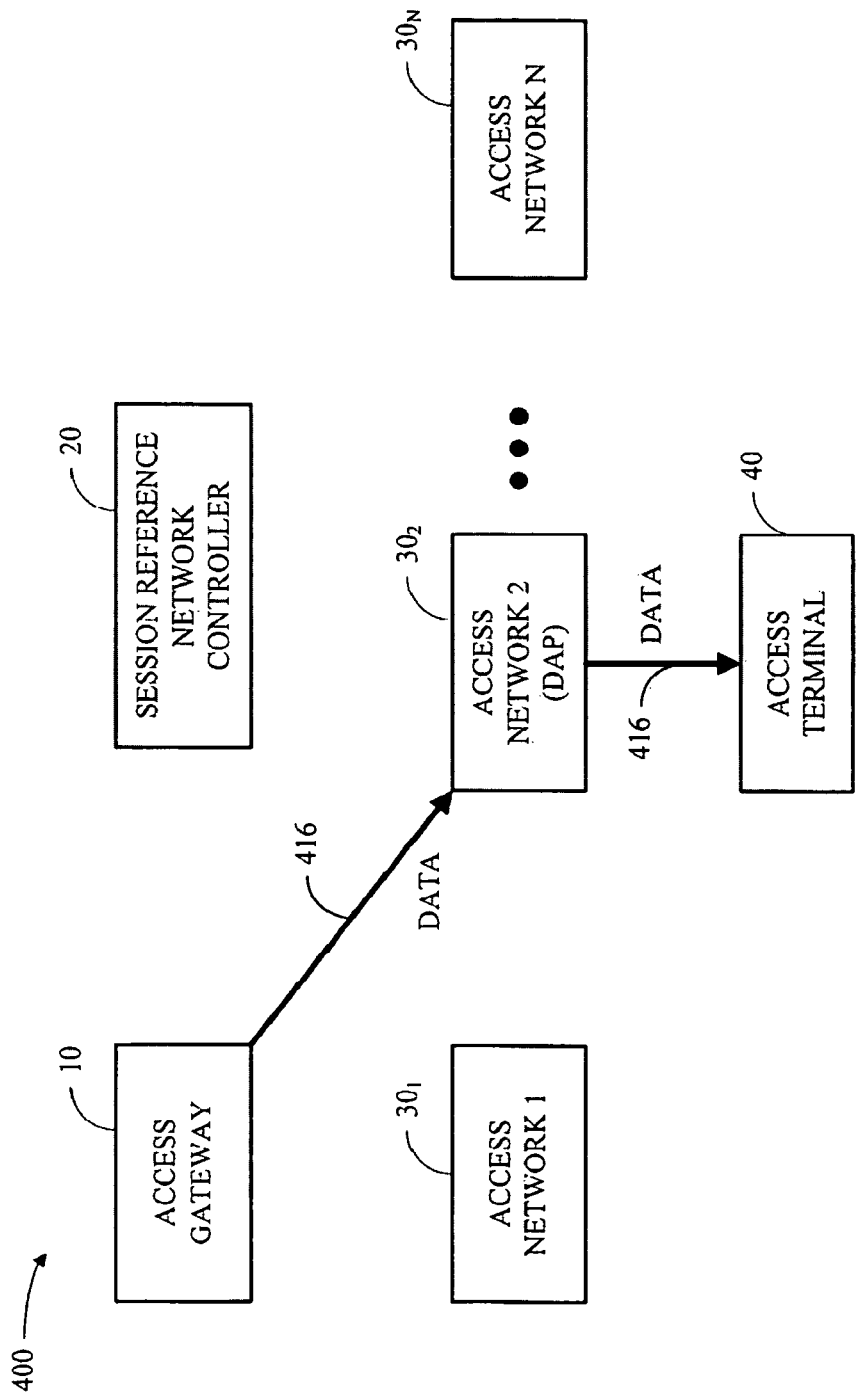

FIGS. 4A-4C illustrate operation of another example system 400 for paging and data buffering based on a location of an access terminal 40 in accordance with various aspects. In a similar manner to system 300, system 400 call include an AGW 10 that can receive data 416 for communication to an access terminal 40. System 400 can also include a plurality of access networks 30, one or more of which can be designated as a DAP(s) for access terminal 40. Each access network 30 in system 400 can also communicate with an SRNC 20 that can provide configuration and registration boundary information for access terminal 40.

In accordance with one aspect, a small registration radius 50 can be configured for access terminal 40 by SRNC 20 and/or another suitable entity in system 400. In one example, the small registration radius 50 can correspond to he coverage area of an access network $30_1$ that has been designated as the DAP for access terminal 40 in a similar manner to system 300. However, unlike the paging procedure illustrated by system 300, access terminal 40 in system 400 can located outside of the small registration radius 50. For example, the access terminal 40 may move from the coverage area of one access network 30 to the coverage area of another access network 30. Further, such a mobile access terminal 40 may also be operating in an idle state such that the access terminal 40 is not engaged in active communication with a serving access network 30 for the current location of the access terminal 40.

Thus, in one example, a large registration radius 60 can further be configured for access terminal 40 by SRNC 20 and/or another suitable entity in system 400, which can correspond to the coverage area of multiple access networks 30 in a given geographic area. Accordingly, to provide data from AGW 10 to access terminal 40 in the event that access terminal 40 has moved outside of its associated small registration radius 50 but remains within its associated large registration radius 60, a paging procedure can be utilized as illustrated by FIGS. 4A-4C.

FIG. 4A illustrates operation of an idle access terminal 40 in the event that the access terminal 40 moves outside of a small registration radius 50 associated with an access network 30. In accordance with one aspect, an access terminal 40 can obtain a set of registration boundaries including small registration radius and/or large registration radius 50 from SRNC 20 and/or another appropriate entity in system 400. Based on this information, an access terminal 40 located in a corresponding small registration radius 50 can communicate a registration signal 402 to a serving access network 30 upon determining that the access terminal 40 has moved outside of the small registration radius 50. In one example, the access terminal can temporarily enter an active state for communication of the registration signal 402 in the event that the access terminal 40 is idle upon moving outside the small registration radius 50. The registration signal can then be communicated to SRNC 20. Based on the registration signal 402 and/or session information stored by the SRNC 20 corresponding to a previous connection of the access terminal 40, SRNC 20 can determine an access network 30 currently serving as the DAP for the access terminal 40 and communicate a notification 404 to the access network 30 that the access terminal 40 has moved to the coverage area of a new access network 30 in the large registration radius 60. In one specific, non-limiting example, the SNRC 20 and access network 30 can be collocated within a single network entity and, as a result, a notification 404 may not be communicated between SRNC 20 and access network 30. In an alternative specific example, SRNC 20 can implement DAP functionality for an access terminal 40 without being collocated with an access network 30 and/or without having radio connectivity with the access terminal 40. Upon receiving a notification 404 that an access terminal 40 has moved, the access network 30 can communicate a request 406 to AGW 10, denoted in FIG. 4A as XOff, to hold any data received at AGW 10 for the access terminal 40. The request 406 can also be referred to as a Flow Control Request, a Data Buffer Request, and/or any other appropriate nomenclature.

In one example, after access terminal 40 moves outside small registration radius 50, it can communicate a registration signal 402 and subsequently utilize large registration radius 60 as its registration boundary such that access terminal 40 is required to communicate a subsequent registration signal 402 only upon moving out of the large registration radius. Thus, it should be appreciated that a registration signal 402 communicated by access terminal 40 can correspond to a large registration radius 60 in which access terminal 40 is located.

Once AGW 10 receives data to be communicated to access terminal 40 in system 400, paging can be initialized as illustrated by FIG. 4B. In accordance with one aspect, based on the XOff instruction 406 received by AGW 10 from access network $30_1$ as illustrated in FIG. 4A, AGW 10 can locally buffer data for access terminal 40 and communicate a notification 408 to access network $30_1$ that data is ready for access terminal 40 rather than communicating the data itself. In one example, the registration signal 402 communicated by access terminal 40 and the subsequent XOff instruction 404 communicate to AGW 10 by access network $30_1$ as illustrated in FIG. 4A demonstrate that it is likely that access terminal 40 has moved away from the coverage area of access network $30_1$. Accordingly, by locally buffering data at AGW 10 in such a situation, the need for tunneling data from access network $30_1$ to another access network within large registration radius 60 that finds access terminal 40 is eliminated, thereby reducing the amount of required backhaul resources for communicating data to access terminal 40. Further, it should be appreciated that the reduction in required backhaul resources can be significant in systems utilizing a star topology wherein each access network 30 communicates with each other through AGW 10 or a centralized router/network switch.

In accordance with another aspect, access network $30_1$ can communicate a paging request 410 to SRNC 20 upon receiving a notification 408 from AGW 10 that data is ready for access terminal 40. In response, SRNC 20 can communicate paging requests 412 to each access network 30 in a paging area corresponding to the large registration radius 60 to which the access terminal 40 is registered. In one example, the paging area utilized can be made larger than its corresponding large registration area 60 to account for time required for paging and registration. Upon receiving paging requests 412, the access networks 30 can then attempt to page access terminal 40 within their respective coverage areas by transmitting paging signals 414. In one example, access terminal 40 can respond to a paging signal 414 from an access network 30 by establishing a connection with the access network 30. For example, as illustrated in FIG. 4C, access terminal 40 can establish a connection with access network 302 upon successful paging. Once a connection is established between access terminal 40 and access network $30_2$, AGW 10 can then communicate data 416 to access terminal 40 through access network $30_2$. In one example, access network 302 can also be designated as a new DAP for access terminal 40. In addition, the small registration radius 50 associated with access terminal 40 can be updated to reflect the coverage area of access network $30_2$.

Figure 5:
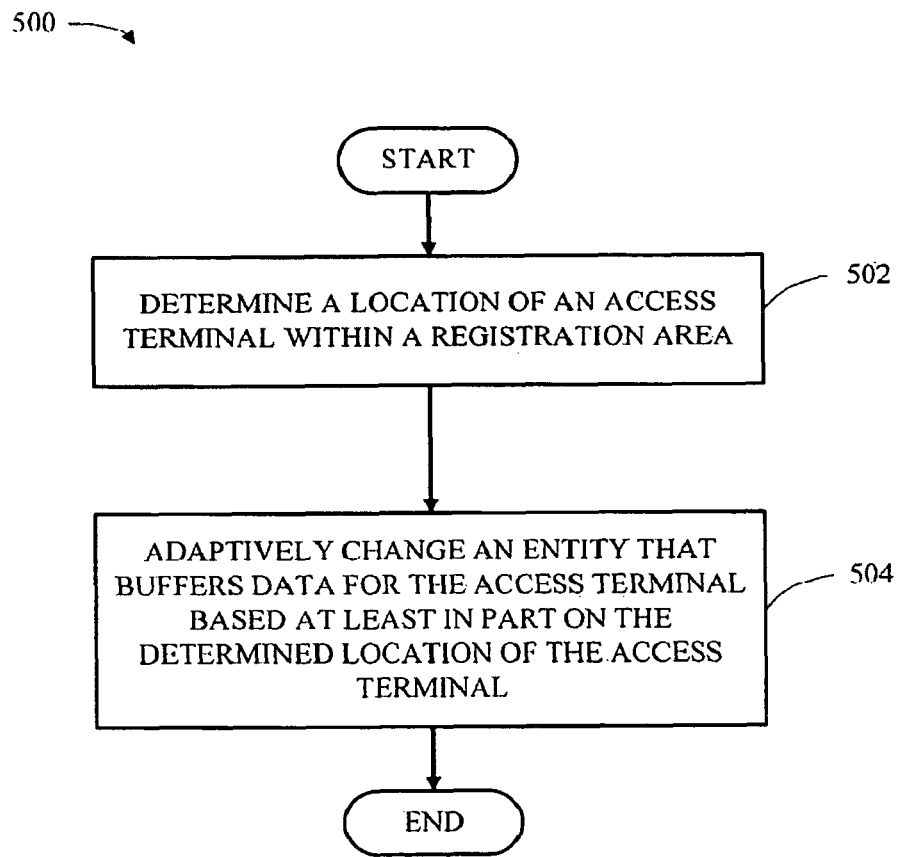
FIG. 5 is a flow diagram of a methodology for delay and backhaul-efficient data buffering in a wireless communication system.
Figure 6:
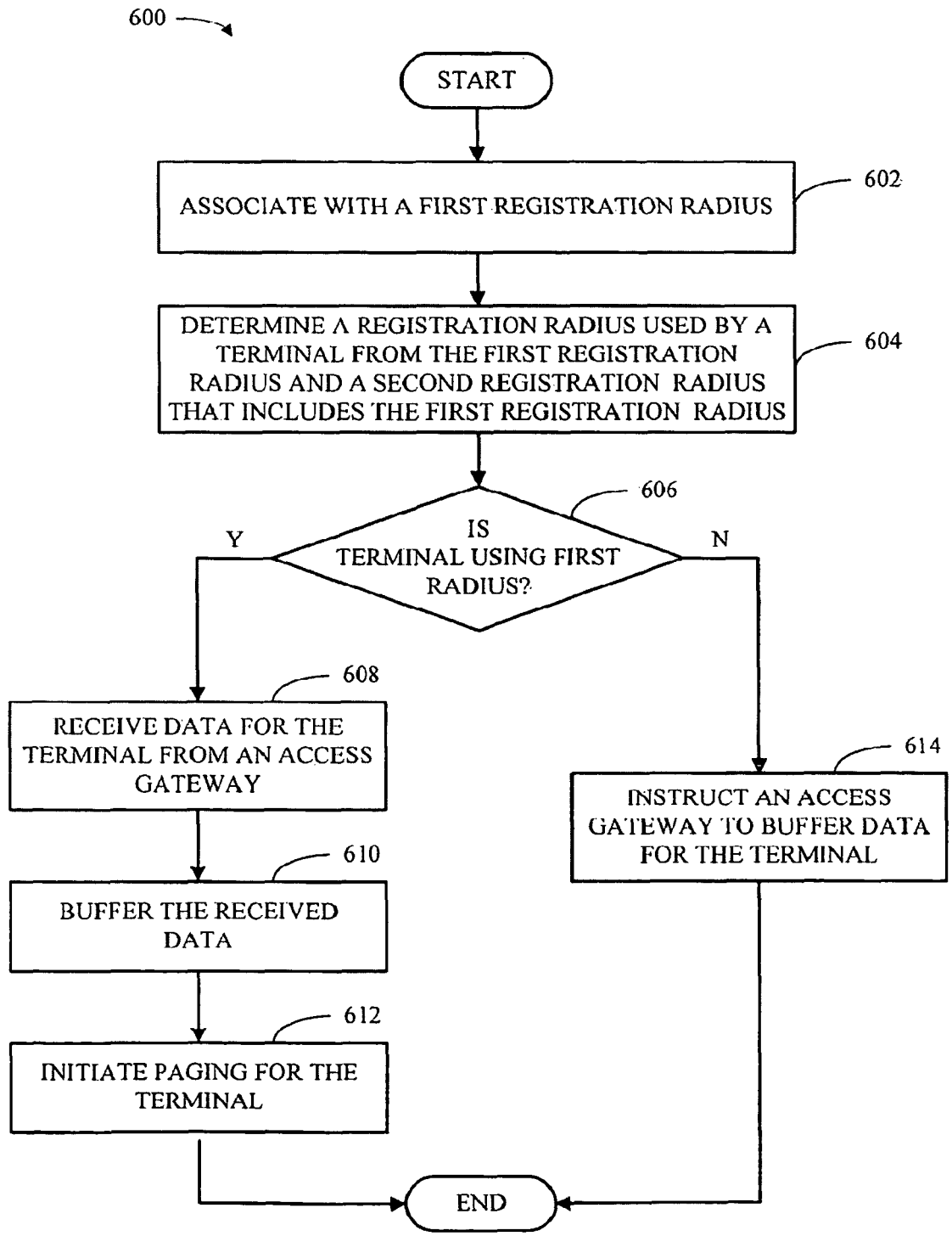
FIG. 6 is a flow diagram of a methodology for coordinating buffering of data provided by an access gateway for a terminal based on a location of the terminal.
Figure 7:
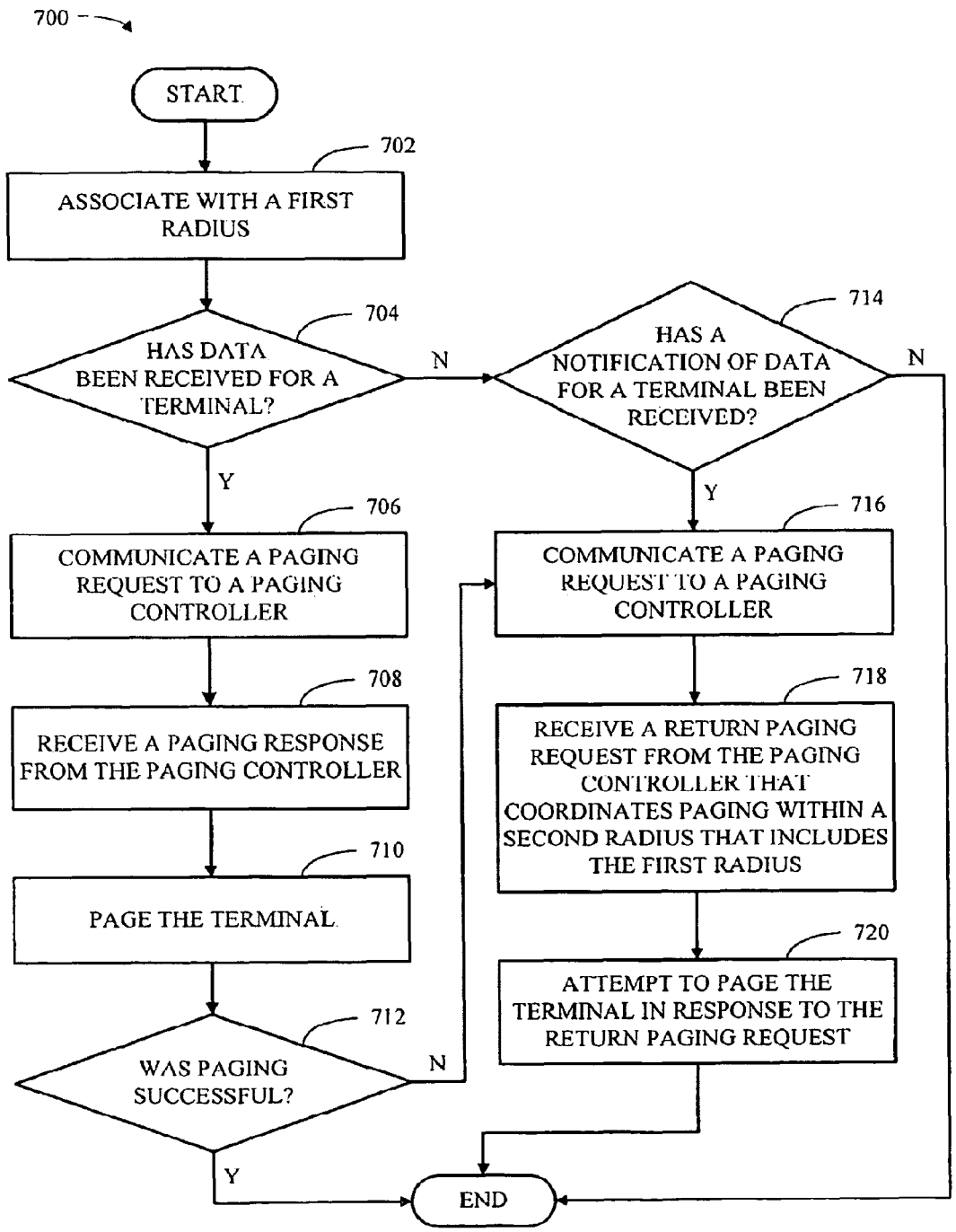
FIG. 7 is a flow diagram of a methodology for delay and backhaul-efficient paging in a wireless communication system.

Referring to FIGS. 5-7, methodologies for efficient data buffering and paging in a wireless communication system are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

With reference to FIG. 5, illustrated is a methodology 500 for delay and backhaul-efficient data buffering in a wireless communication system (e.g., system 200). It is to be appreciated that methodology 500 can be performed by, for example, an access point (e.g., an access network 30) and/or any other appropriate network entity. Methodology 500 begins at block 502, wherein a location of an access terminal (e.g., an access terminal 40) within a registration area is determined. In accordance with one aspect, the registration area utilized at block 502 can correspond to an area associated with a set of access points. This area can include, for example, a small registration area (e.g., an area corresponding to a small registration radius 50) associated with the coverage area of a data attachment point associated with the access terminal. Additionally, the small registration area can be located inside a larger registration area (e.g., an area corresponding to a large registration radius 60) associated with the coverage area of a set of access points that includes the data attachment point associated with the access terminal. In one example, the boundaries of these registration areas can be set by a session reference network controller (e.g., a SRNC 20) and/or another appropriate network entity.

In accordance with another aspect, the determination at block 502 can be made by determining whether the access terminal is in the coverage area of its associated data attachment point. In one example, an access terminal in a system in which methodology 500 is implemented can be configured to register with a session reference network controller and/or another network entity if it leaves the coverage area of its data attachment point. Thus, if no registration is received from the access terminal, it can be inferred at block 502 dial the access terminal has not left the coverage area of its data attachment point. Conversely, if registration is received from the access terminal, it can be inferred at block 502 that the access terminal has left the coverage area of its data attachment point and is presently at a location within the registration area. It should be appreciated, however, that an access terminal that registers with a network entity may not necessarily be outside of the coverage area of the data attachment point at the time of the determination at block 502. Fur example, an access terminal can leave the coverage area of a data attachment point, submit registration, and then subsequently return to the coverage area of the data attachment point.

Upon completing the act described at block 502, methodology 500 can conclude at block 504, wherein an entity that buffers data for the access terminal is adaptively changed based at least in part on the location of the access terminal determined at block 502. In one example, data can be buffered at block 504 in connection with a transfer of data from an access gateway (e.g., access gateway 10) to the access terminal. Accordingly, the entity that buffers data for the access terminal at block 504 can be adaptively changed based on the determination at block 502 as follows. If it is determined at block 502 that the access terminal is located within the coverage area of its data attachment point, data can be provided by the access gateway to the data attachment point. Upon receiving the data from the access gateway, the data attachment point can buffer the data. Alternatively, if it is determined at block 504 that the access terminal has left the coverage area of its data attachment point, the data attachment point for the terminal can provide a notification (e.g., an XOff notification 406) to the access gateway to instruct the access gateway to buffer data for the access terminal. In one example, upon buffering data at the access gateway, an access terminal for which the data is intended can then be located using a paging procedure such as the procedure illustrated by FIGS. 4A-4C. The data can then be provided to the terminal through an access point providing coverage for an area in which the terminal is located.

Additionally and/or alternatively, other information can be used to determine an entity that buffers data for the access terminal at block 504. In one example, the determination at block 504 can be made based at least in part on applications running at the access terminal. For example, if an access terminal is engaged in a push-to-talk session or another delay-sensitive application, a determination can be made at block 504 to buffer data at the access gateway less often (or never) to reduce the delay experienced by die access terminal. In another example, the determination at block 504 can be made based in part on a recent activity level of the access terminal, which can be provided by an idle activity timer associated with the access terminal and/or by other appropriate means. For example, if an access terminal has been idle for a predetermined period of time prior to the determination at block 504, it can be inferred that the access terminal will likely remain idle. As a result, a determination to buffer data at die access gateway at block 504 call be made more often as the access terminal will likely be less sensitive to delay due to its idle state. Conversely, if an access terminal has recently been active, it can be inferred that the access terminal is likely to remain active and a determination can be made at block 504 to buffer data at the access gateway less often.

FIG. 6 illustrates a methodology 600 for coordinating buffering of data provided by an access gateway (e.g., access gateway 10) for communication to a terminal (e.g., access terminal 40) based on a location of the terminal. It is to be appreciated that methodology 600 can be performed by, for example, an access point (e.g., access network 30) and/or any other appropriate entity in a wireless communication system. Methodology 600 begins at block 602, wherein an entity performing methodology 600 associates with a first registration radius (e.g., a small registration radius 50). In one example, the first registration area at block 602 corresponds to a coverage area of the entity performing methodology 600. Further, the first registration radius can be provided by a session reference network controller (e.g., SRNC 20) and/or another appropriate entity.

Next, at block 604, a radius used by the terminal is determined from the first registration radius and a second registration radius (e.g., a large registration radius 60) that includes the first registration radius. The second registration radius can also be provided by a session reference network controller and/or another appropriate entity and can correspond to, for example, a combined coverage area for a set of access points. In one example, the determination at 604 can be made by monitoring for a registration submitted by the terminal in a similar manner to the determination at block 502 of methodology 500. For example, a terminal can be configured to utilize the first registration radius while it remains in the coverage area of the entity performing methodology 600 and to submit registration and switch to the second registration radius upon leaving the coverage area. As a result, the registration area utilized by the terminal can be determined at block 604 based on the presence or absence of a registration submitted by the terminal.

Upon making the determination at block 604, methodology 600 branches at block 606 based on the result of the determination. If it is determined at block 604 that the terminal is utilizing the first registration radius, methodology 600 can proceed to block 608, wherein data (e.g., data 302) is received for the terminal from an access gateway. Methodology 600 can then continue to block 610, wherein the data received at block 608 is buffered for subsequent communication to the terminal, and conclude at block 612, wherein paging is initiated for the terminal.

Alternatively, if it is determined at block 604 that the terminal is instead utilizing the second registration radius, methodology can branch from block 606 to block 614, wherein an access gateway is instructed to buffer data for the terminal. In accordance with one aspect, the second registration radius corresponds to a plurality of access points that could potentially provide communication coverage for the terminal. Therefore, a notification (e.g., an XOff notification 406) can, be communicated to the access gateway at block 614 to locally buffer data for the terminal pending its location. By instructing the access gateway to locally buffer the data rather than allowing it to communicate the data to the entity performing methodology 600, backhaul resources can be saved in the event that the terminal is not within the coverage area of the entity performing methodology 600.

FIG. 7 illustrates a methodology 700 for delay and backhaul-efficient paging in a wireless communication system. It is to be appreciated that methodology 700 can be performed by, for example, an access point and/or any other appropriate entity in a wireless communication system. Methodology 700 begins at block 702, wherein an entity performing methodology 700 associates with a first radius (e.g., a small registration radius 50). In one example, the first registration area at block 702 can correspond to a coverage area of the entity performing methodology 700. The first radius can additionally be made sufficiently larger than said coverage area to account for time required for paging and registration in the wireless communication system. The first radius can be provided by a paging controller (e.g., SRNC 20) and/or another appropriate entity.

Methodology 700 then proceeds to block 704, where it is determined whether data has arrived at the entity performing methodology 700 for a terminal. In accordance with one aspect, the arrival of data for a terminal at block 704 can indicate that the entity performing methodology 700 has been designated to buffer data for the terminal, and consequently that the terminal is located within the first radius associated with the entity performing methodology 700, in a similar manner to that illustrated by system 300 and methodology 600.

Accordingly, if it is determined at block 704 that data has been received for the terminal, methodology 700 can proceed to block 706, wherein a paging request (e.g., a paging request 304) is communicated to a paging controller. In one example, a paging request can be provided to the paging controller at block 706 in a similar manner to that illustrated by FIGS. 3A-3B. Methodology 700 then continues to block 708, wherein a corresponding paging response (e.g., a paging response 306) is received from the paging controller. Based on the paging response received at block 708, the terminal can then be paged at block 710. In one example, paging is conducted at block 710 by communicating a paging signal (e.g., a paging signal 308) to the terminal to establish a connection with the terminal. Methodology 700 can then proceed to block 712, where it is determined whether the paging at block 710 was successfully performed. If the paging at block 710 was successfully performed, methodology 700 concludes. Otherwise, if the paging at block 710 fails, due to signal fading, movement of the terminal outside the coverage area of the entity performing methodology 700 during paging, and/or other factors, methodology 700 can instead proceed to block 716 to initiate a second, expanded paging attempt as discussed in more detail supra.

In one example, if it is determined at block 704 that data has not arrived for the terminal, methodology 700 can proceed to block 714, where it is further determined whether a notification (e.g., a notification 406) of data for the terminal has been received. In accordance with one aspect, the arrival of a notification at block 714 can indicate that the entity performing methodology 700 has designated an access gateway (e.g., access gateway 10) and/or another entity to buffer data for the terminal, and consequently that the terminal is located outside the first radius associated with the entity performing methodology 700, in a similar manner to that illustrated by system 400 and methodology 600. Accordingly, methodology 700 can proceed to block 716 upon a positive determination at block 714. In contrast, if it is determined that a notification has not been received at block 714, the entity performing methodology 700 can infer that either no data is ready for transmission to the terminal or that the terminal has moved beyond the range of the paging controller, and methodology 700 can conclude as a result.

Upon a positive determination at block 714 or a negative determination at block 712, methodology 700 proceeds to block 716, where a paging request (e.g., a paging request 408) is communicated to the paging controller in a similar manner to the request communicated at block 706. Next, at block 718, a return paging request (e.g., a paging request 410) is received from the paging controller that coordinates paging within a second radius that includes the first radius associated with the entity performing methodology 700. In one example, the second radius can correspond to the coverage area of the paging controller and/or another suitable network entity or collection of entities. Accordingly, the return paging request at block 718 can be communicated to one or more access points within the second radius, which can include an entity performing methodology 700. Methodology 700 can then conclude at block 720, wherein the entity performing methodology 700 attempts to page the terminal in response to the return paging request received at block 718. In one example, all access points to which the return paging request is communicated at block 718 can attempt to page the terminal at block 720. If an access point is able to successfully page the terminal, it can subsequently be designated as a data attachment point for the terminal such that data can be communicated to the terminal through the access point.

Figure 8:
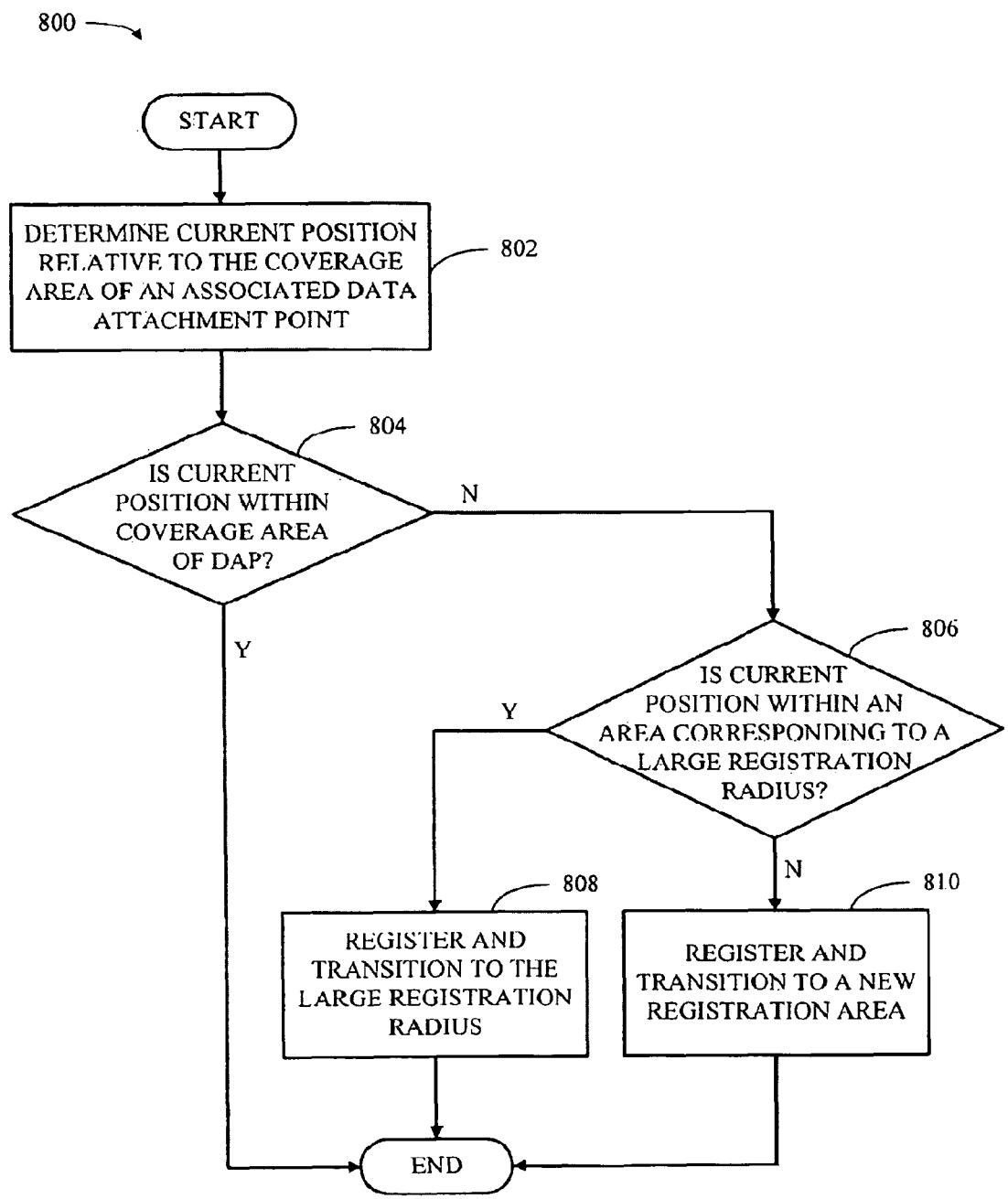
FIG. 8 is a flow diagram, of a methodology for coordinating registration based on a current position in a wireless communication system.

FIG. 8 illustrates a methodology 800 for coordinating registration based on a current position in a wireless communication system. It is to be appreciated, that methodology 800 can be performed by, for example, a terminal (e.g., access terminal 40) and/or any other suitable entity in a wireless communication system. Methodology 800 begins at block 802, wherein a current position is determined relative to the coverage area of an associated data attachment point. In one example, the determination at block 802 can be made based on registration boundaries provided by a session reference network controller and/or another suitable network entity. Further, the associated data attachment point can be an access network (e.g., an access network 30) and/or another network entity that can provide data to an entity performing methodology 800.

Methodology 800 can then proceed to block 704, wherein a determination can be made as to whether the current position determined at block 802 is within the coverage area of the associated data attachment point. In the event that a positive determination is made at block 804, methodology 800 can conclude. Otherwise, methodology 800 can proceed to block 806, wherein a further determination is made as to whether the current position determined at block 802 is within an area corresponding to a large registration radius. If it is determined at block 806 that the current position is within the area corresponding to the large registration radius, methodology 800 can conclude at block 808, wherein the entity performing methodology 800 registers (e.g., with SRNC 20) and transitions to the large registration radius from the small registration radius. On the other hand, if it is determined at block 806 that the current position is not within the area corresponding to the large registration radius, methodology 800 can instead conclude at block 810, wherein the entity performing methodology 800 can register (e.g., with a new SRNC) and transition to a new registration area (e.g., a registration area associated with a large registration radius, corresponding to the new SRNC).

Turning now to FIGS. 9-17, process flow diagrams illustrating operating procedures for an example, wireless communication are illustrated. It should be appreciated, however, that the process flow diagrams described below are provided by way of example and not limitation and that other operating procedures can also be carried out by a wireless communication system in accordance with various aspects described herein. It should further be appreciated that all such operating procedures are intended to fall within the scope of the hereto appended claims.

As illustrated by FIGS. 9-17, call flows for idle state mobility and paging of access terminals (ATs) in a wireless communication network are provided. In particular, FIGS. 9-17 illustrate call. flows for connection close, registration, paging, and AT initiated call re-activation from idle. The operation of the process flow diagrams illustrated in FIGS. 9-17 can be generally described as follows as a prelude to the more detailed description of the individual diagrams that follows.

In accordance with one aspect, when the airlink connection of an AT closes, the AT can enter an idle state. When an AT enters an idle state, each access network in a Route Set corresponding to the AT (e.g. Access Network Route Instances or ANRIs) should be made aware that the connection has closed for various reasons. For example, if data arrives for the idle AT, then the Data Attachment Point (DAP) for the AT can be required to page the AT. In order to do so, however, both a Session Reference Network Controller (SRNC) and the DAP need to be informed that the AT is in idle state. In addition, both the SRNC and the DAP can be instructed to keep track of the last FLSE (Forward Link Serving Evolved Base Station (eRS)) for the AT. The SRNC can use the identity of the last FLSE to determine a paging area of the AT. The SRNC can also keep track of when the connection is closed to determine the appropriate paging cycle. Further, ANRIs in the Route Set should additionally be made aware that the connection has closed to allow any other ANRIs in the Route Set to perform appropriate resource release procedures once the connection is closed.

Meanwhile, the DAP needs to be aware of Inter-ANRI Signaling (IAS) Notification messages that indicate a new FLSE for the AT when the AT wakes up from an idle state in order to forward any packets received and buffered while the AT is idle. Thus, the FLSE for an AT can send notifications to all of the ANRIs in the Route Set for both graceful and non-graceful connection close scenarios as illustrated in the process flow diagrams infra.

In accordance with another aspect, when an AT or ANRI closes a connection, the AT can become idle and terminate all routes to ANRIs in the Route Set with the exception of a Session. Anchor Route with the SRNC, which holds the idle state personality of the AT. Accordingly, since the SRNC maintains paging area and paging cycle information relating to the AT, the AT can be configured to register with the SRNC again after the AT leaves a registration boundary as further illustrated in the process flow diagrams infra.

In accordance with an additional aspect, when data for an idle AT arrives at an Access Gateway (AGW) for local buffering at the AGW, the AGW can initiate a paging procedure with the SRNC. For example, the SRNC can determine a paging area database for the AT based upon the location of the AT when the connection is closed or subsequently when the AT performs registration. Alternatively, when data or an indication that an AGW has data for an idle AT arrives at the DAP, the DAP can initiate a paging procedure with the SRNC. For example, the SRNC can determine the paging area database for the AT based upon the location of the AT when the connection is closed or subsequently when the AT performs registration. The SRNC can then send an IAS-Paging Request message to all ANRIs in the paging area to initiate an over-the-air paging procedure. Once the AT receives the page, it can perform a connection establishment procedure as illustrated infra.

Further, at any time while an AT is idle, the AT can re-activate from its idle state. In accordance with various aspects illustrated infra, in order to simplify call processing procedures, procedures utilized for this scenario to he similar to procedures utilized when an AT receives a page for re-activation.

Figure 9:
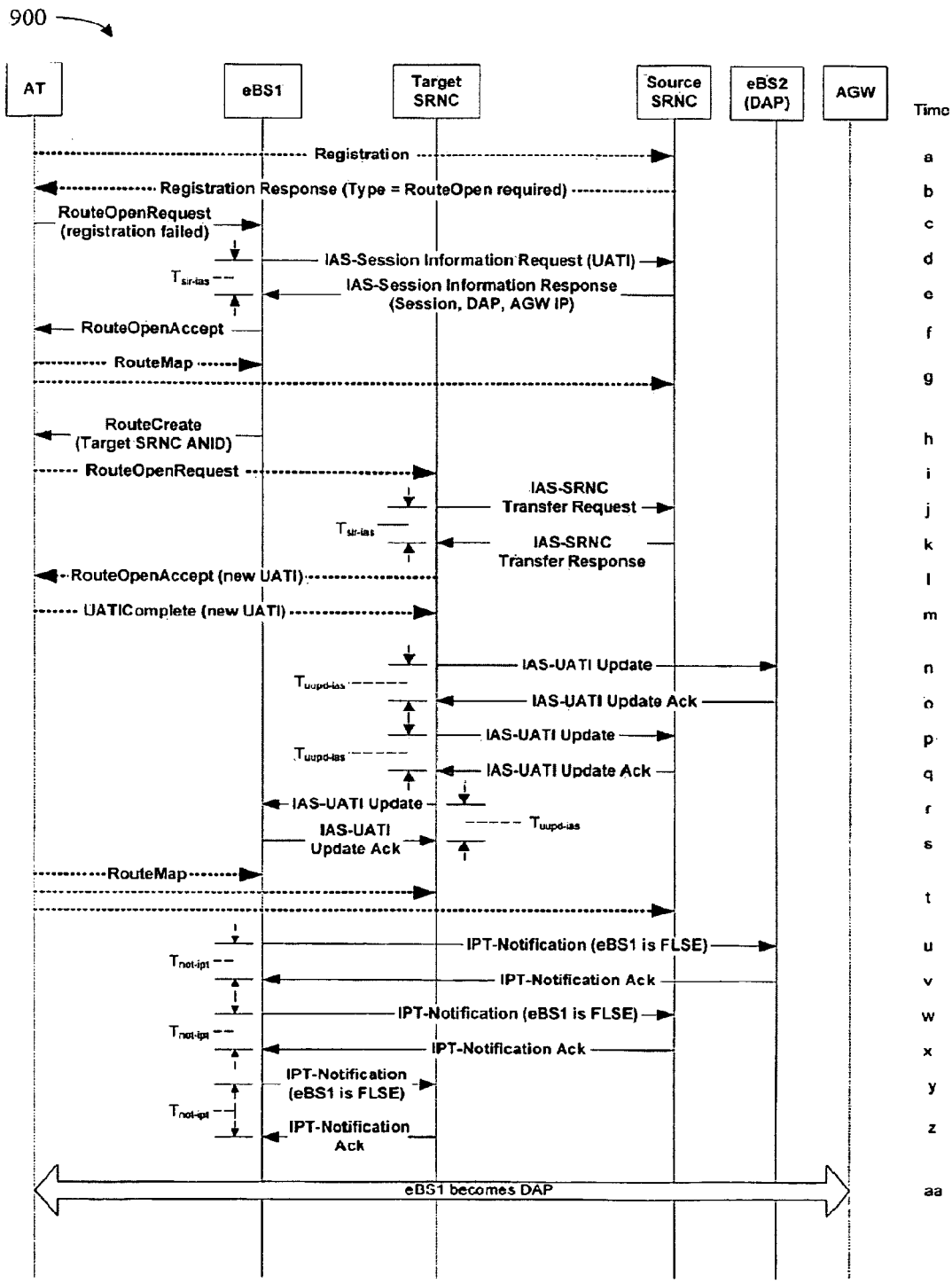
FIG. 9 is a process flow diagram that illustrates registration between an access terminal and a base station.

Turning specifically to the diagrams, FIG. 9 is a process flow diagram 900 that illustrates, registration between an access terminal and a base station. Specifically, diagram 900 illustrates a procedure in which an AT registers with an eBS that is not supported by a current SRNC. Subsequently, a Session Anchor ANRI is moved to another SRNC. Further, it is assumed in diagram 900 that the AT begins the procedure in an idle state. First, at time a, the AT registers with a source SNRC. The registration message is then tunneled through a first base station, denoted as eBS1. At time b, the source SRNC determines that eBS1 should be served by another SRNC (e.g., because the SRNC does not have a paging area database around eBS1). The source SRNC then responds to the AT with a Registration Response message with the cause value of "RouteOpen required." Upon receipt of the Registration Response message at time c, the AT sends a RouteOpenRequest to eBS1 with an indication that registration with the SRNC has failed.

Upon receipt of the RouteOpenRequest message, eBS1 sends an IAS-Session Information Request to the source SRNC to retrieve session information of the AT and starts timer $T_{sir\text{-}ias}$ at time d. The source SRNC receives the IAS-Session Information Request message at time ∈ and responds by sending an IAS-Session Information Response message to eBS1. This message includes the session information of the AT and the address of the AGW. Next, at time f, eBS1 receives the IAS-Session Information Response message, stops timer $T_{sir\text{-}ias}$, and sends a RouteOpenAccept message to the AT. In response, the AT sends RouteMap messages to all ANRIs in the Route Set at time g.

In addition to the actions performed by eBS1 at time d in response to the RouteOpenRequest message, eBS1 can also send a RouteCreate message with the target SRNC Access Network ID (ANID) to the AT at time h in response to the RouteOpenRequest message. Upon receipt of the RouteCreate message, the AT sends a RouteOpenRequest message to the target SRNC through eBS1 at time i. The tunneling header of this message can contain both the Stable Session ID (SSID) and the current Unicast Access Terminal Identifier (UATI) of the AT. Next, at time j, the target SRNC can respond to receipt of the RouteOpenRequest message with the UATI of the AT by sending an IAS-SRNC Transfer Request message to the source SRNC to request a session reference transfer. The target SRNC can also start timer $T_{str\text{-}ias}$.

At time k, the source SRNC can respond to the communication from the target SRNC made at time j with an IAS-SRNC Transfer Response message. Once the source SRNC sends the IAS-SRNC Transfer Response message, it can lock its session such that it rejects any further session modification but still accepts requests for a copy of the session and/or requests to page the AT. Upon receipt of the IAS-SRNC Transfer Response message at time l, the target SRNC stops timer $T_{str\text{-}ias}$ and also locks its session. Further, the target SRNC can send a RouteOpenAccept message to the AT containing a new UATI for the AT. Upon assignment of the new UATI, the AT can send a UATIComplete message to the target SRNC at time m. Accordingly, the target SRNC ANRI becomes the Session Anchor ANRI for the AT at time m.

Upon receipt of the UATIComplete message or signaling message addressed to the new UATI, the target SRNC can unlock its session. For example, the target SRNC can allow session configuration, become the SRNC for the AT, and, send IAS-UATI Update message to all ANRIs in the Route Set and the DAP of the AT. Accordingly, at time n, the target SRNC sends an IAS-UATI Update message with the new UATI and the new UATI Sequence Number (UATI_SeqNo) to the DAP and starts timer $T_{uupd\text{-}ias}$. Upon receipt of the IAS-UATI Update message, the DAP sends an IAS-UATI Update Ack message back to the target SRNC at time o. Upon receipt of the IAS-UATI Update Ack message, the target SRNC stops timer $T_{uupd\text{-}ias}$.

The target SRNC then sends an IAS-UATI Update message with the new UATI and the new UATI_SeqNo to eBS1 and restarts timer $T_{uupd\text{-}ias}$ at time p. Upon receipt of the IAS-UATI Update message, the source SRNC releases the old UATI and sends an IAS-UATI Update Ack message back to the target SRNC at time q. It should be appreciated that, after time q, the source SRNC can terminate its route with the AT at any time. Upon receipt of the IAS-UATI Update Ack message, the target SRNC stops timer $T_{uupd\text{-}ias}$ and sends an IAS-UATI Update message with the new UATI and the new UATI_SeqNo to eBS1 and again restarts timer $T_{uupd\text{-}ias}$ at time r. Upon receipt of the IAS-UATI Update message, eBS1 send-s an IAS-UATI Update Ack message back to the target SRNC at time s. Upon receipt of the IAS-UATI Update Ack message, the target SRNC again stops timer $T_{uupd\text{-}ias}$.

Next, the AT sends RouteMap message to all ANRIs in the Route Set, including the target SRNC, at time t. Further, after sending a RouteOpenAccept message to the AT, eBS1 notifies all ANRIs in the Route Set and the previous DAP of the AT that it has become the FLSE for the AT at time u. At this time, eBS1 also starts timer $T_{not-ipt}$. Upon receipt of the IPT-Notification message, the DAP acknowledges with an IPT-Notification Ack message to eBS1 at time v. In addition, the DAP also stops timer $T_{pgreq-ias}$ and enters a connected state at time v. Next, at time w, eBS1 receives the IPT-Notification Ack message and, in response, stops timer $T_{not-ipt}$ and sends an IPT-Notification message to the source SRNC indicating that eBS1 is the FLSE. Upon sending the IPT-Notification message, eBS1 restarts timer $T_{not-ipt}$.

Upon receipt of the IPT-Notification message, the source SRNC also acknowledges with an IPT-Notification Ack message to eBS1 at time x. Upon receipt of the IPT-Notification Ack message, eBS1 again. stops timer $T_{not-ipt}$, sends an IPT-Notification message to the target SRNC indicating that eBS1 is the FT-SE, and again restarts timer $T_{not-ipt}$ at time y. Next, at time i, upon receipt of the IPT-Notification message, the target SRNC acknowledges with an IPT-Notification Ack message to eBS1. Upon receipt of the IPT-Notification Ack message, eBS1 stops timer $T_{not-ipt}$. Finally, at time aa, DAP is moved to eBS1, which is the new FLSE.

Figure 10:
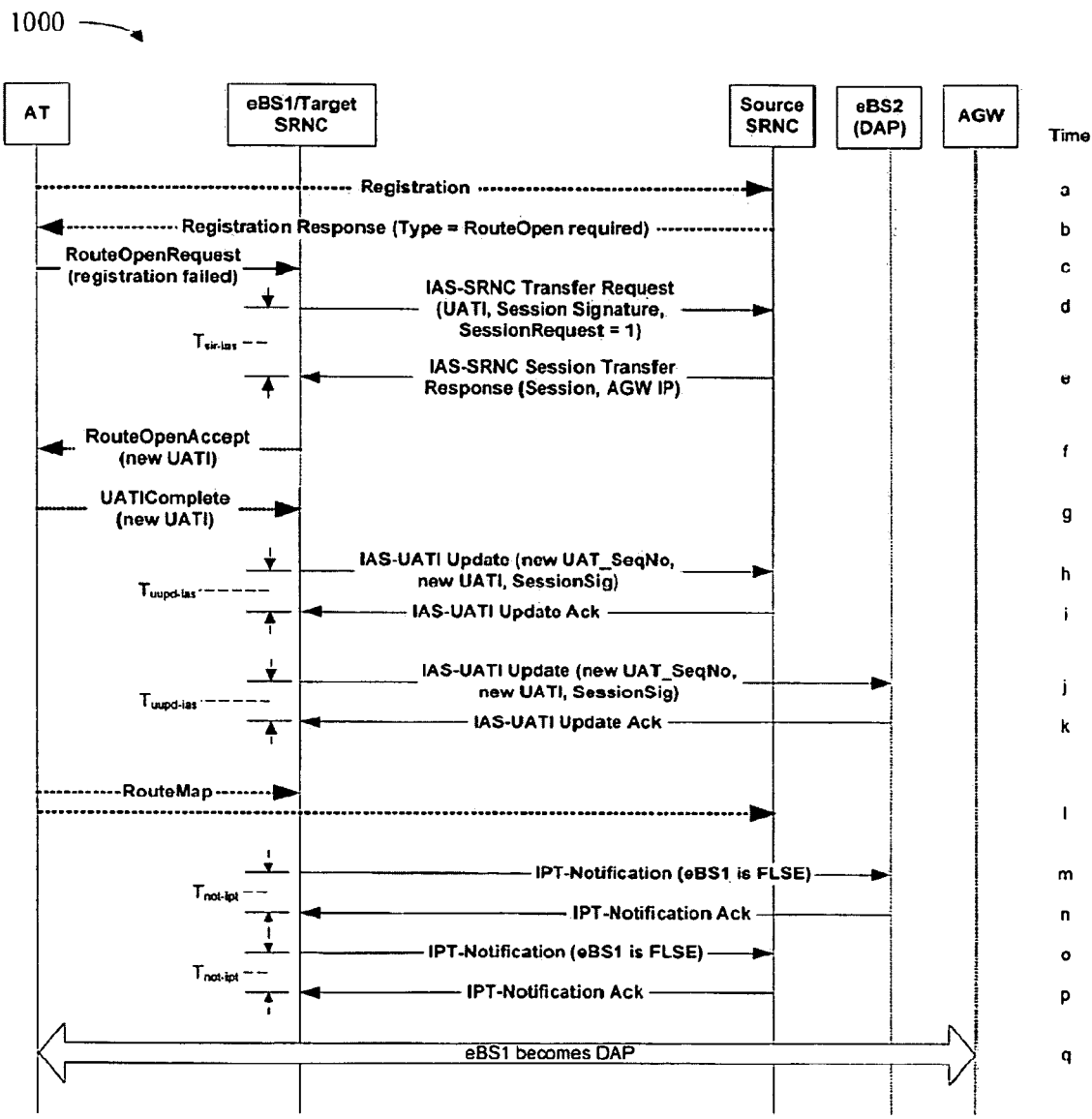
FIG. 10 is a process flow diagram that illustrates registration between an access terminal and a base station.

FIG. 10 is an additional process flow diagram 1000 that illustrates registration between an access terminal and a base station. Specifically, diagram 1000 illustrates a procedure in which an AT registers with an eBS that is not supported by the current SRNC. Subsequently, the Session Anchor ANRI is moved to a local eBS. Further, it is assumed in diagram 1000 that the AT begins the procedure in an idle state. Moreover, diagram 1000 depicts an implementation option wherein an eBS and SRNC are co-located. Diagram 1000 begins at time a, wherein the AT registers with the source SNRC. The registration message is tunneled through eBS1. Next, at time b, the source SRNC determines that eBS1 should be served by another SRNC (e.g., because the SRNC does not have a paging area database around eBS1) and responds to the AT with a Registration Response message with the cause value of "RouteOpen required." Upon receipt of the Registration Response message, the AT sends a RouteOpenRequest to eBS1 at time c with an indication that registration with the SRNC has failed. Following this action, eBS1 can elect at time d to host a Session Anchor ANRI and send an IAS-SRNC Transfer Request to the source SRNC. Further, eBS1 can start timer $T_{str-ias}$. Upon receipt of an IAS-SRNC Transfer Request message with a SessionRequest flag, the source SRNC responds at time e by sending an IAS-SRNC Transfer Response message to eBS1. This message can include session information of the AT and the address of an AGW. Upon receipt of the IAS-SRNC Transfer Response message, eBS1 stops timer $T_{str-ias}$.

Upon receipt of the IAS-SRNC Transfer Response message, eBS1 sends a RouteOpenAccept message to the AT at time f. This message includes a new UATI for the AT. Upon assignment of the new UATI, the AT can send a UATIComplete message to eBS1 time g. At this time, the target SRNC ANRI can become the Session Anchor ANRI for the AT. Further, upon receipt of the UATIComplete message, eBS1 can unlock its session such that it allows session configuration, becomes the SRNC for the AT and sends an IAS-UATI Update message to all ANRIs in the Route Set. Accordingly, eBS1 can send an IAS-UATI Update message at time h with the new UATI and the new UATI_SeqNo to the source SRNC and start timer $T_{uupd-ias}$. Upon receipt of the IAS-UATI Update message, the source SRNC releases the old UATI and sends an IAS-UATI Update Ack message back to eBS1 at time i. It should be appreciated that the source SRNC may terminate its route with the AT any time after this step. Upon receipt of the IAS-UATI Update Ack message, the target SRNC stops timer $T_{uupd-ias}$.

Next, at time j, eBS1 sends an IAS-UATI Update message with the new UATI and the new UATI_SeqNo to the DAP and starts timer $T_{uupd-ias}$. Upon receipt of the IAS-UATI Update message, the DAP sends an IAS-UATI Update Ack message back to eBS1 at time k. Upon receipt of the IAS-UATI Update Ack message, the target SRNC stops timer $T_{uupd-ias}$. The AT can then send RouteMap message to all ANRIs in the Route Set, including the target SRNC, at time l. After sending RouteOpenAccept message to the AT, eBS1 can further notify all ANRIs in the route set and the previous DAP of the AT that it has become the FLSE for the AT. Accordingly, at time m, based on the ANID of the DAP received. from the source SRNC, eBS1 sends an IPT-Notification message to the DAP and all ANRIs in the Route Set indicating that eBS1 is the FLSE. Additionally, eBS1 starts timer $T_{not-ipt}$.

At time n, upon receipt of the IPT-Notification message, the DAP acknowledges with an IPT-Notification Ack message to eBS1. Upon receipt of the IPT-Notification Ack message, eBS1 stops timer $T_{not-ipt}$. eBS1 then sends an IPT-Notification message to the source SRNC at time o that indicates that eBS1 is the FLSE. eBS1 then restarts timer $T_{not-ipt}$. Upon receipt of the IPT-Notification message, the source SRNC acknowledges with an IPT-Notification Ack message to eBS1 at time q. Upon receipt of the IPT-Notification Ack message, eBS1 again stops timer $T_{not-ipt}$. Finally, at time q, DAP is moved to eBS1. which is the FLSE.

Figure 11:
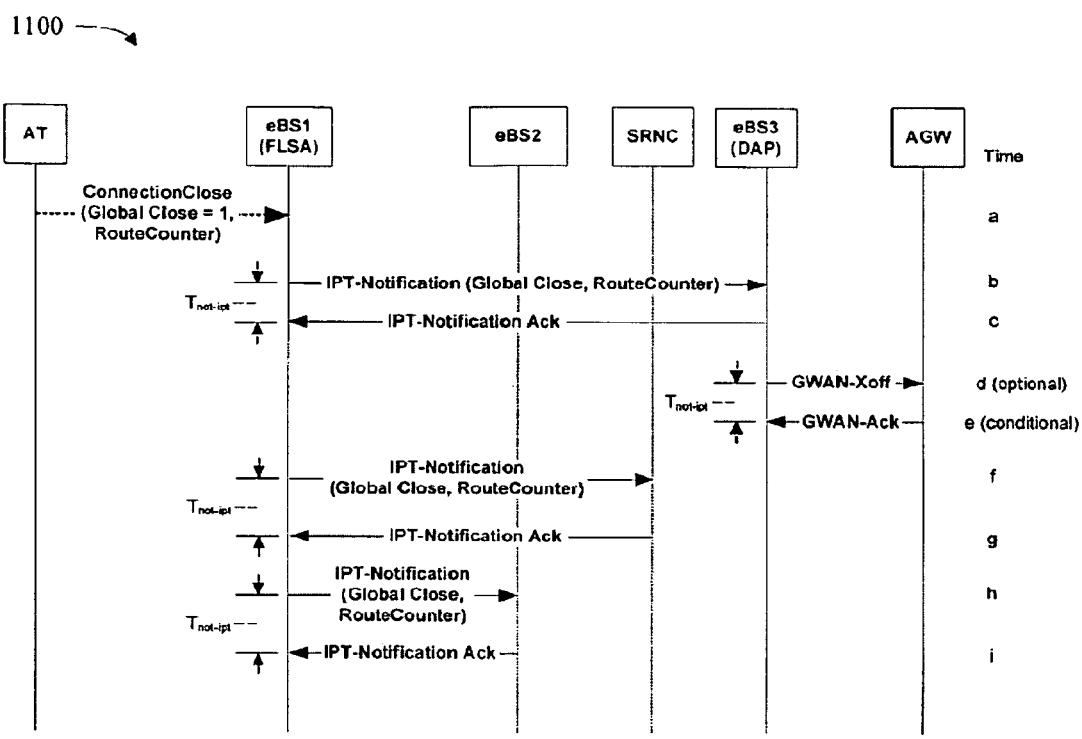
FIG. 11 is a process flow diagram that illustrates a graceful connection close for a connection between an access terminal and a base station.

FIG. 11 is a process flow diagram 1100 that illustrates a graceful connection close for a connection between an access terminal and a base station. Specifically, diagram 1100 illustrates a procedure in which an AT sends a ConnectionClose. message with a GlobalClose-flag to the ELSE to notify that the AT has gracefully closed its connection. It is assumed in diagram 1100 that eBS1 is the FLSE when the AT closes the connection and eBS1 (FLSE), eBS2, SRNC and eBS3 (DAP) are all in the Route Set at the beginning of the procedure. The process begins at time a, wherein the AT sends a ConnectionClose message to eBS1, which is the FLSE, with a GlobalClose flag set. The message also includes the last RouteCounter that the AT has assigned to a route.

Upon receipt of the ConnectionClose message from the AT, eBS1 can send IPT-Notification messages with Global Close indications to all ANRIs in the Route Set. Accordingly, operation may continue as illustrated at times b through i. It should be appreciated that the actions described at times b through i can occur in parallel. At time b, eBS1 can send an IPT-Notification message to eBS3 with an indication of Global Close and start timer $T_{not-ipt}$. Next, upon receipt of the IPT-Notification message with the Global Close indication, the eBS3 can enter paging mode at time c. For example, eBS3 can be configured to send a IAS-Paging Request message. to the SRNC whenever it receives IP packets for the AT. Further, eBS3 can also respond to the FLSE with an IPT-Notification Ack message to eBS1. Upon receipt of the IPT-Notification Ack message, the eBS1 stops timer $T_{not-ipt}$.

Next, at time d, if the DAP cannot buffer data for idle ATs, then eBS3 DAP sends a GWAN-Xoff message to the AGW. Upon sending the GWAN-Xoff message, eBS3 starts timer $T_{ack-gwan}$. Upon receipt of the GWAN-Xoff message, the AGW sends a GWAN-Ack message to eBS3 at time e. Further, upon receipt of the GWAN-Ack message, eBS3 stops timer $T_{ack-gwan}$. At time f, eBS1 sends an IPT-Notification message to the, SRNC with an indication of Global Close and starts timer $T_{not-ipt}$. Upon receipt of the, IPT-Notification message, the SRNC enters idle mode and uses the identity of eBS1 and the current time to determine the paging behavior at time g. In addition, the SRNC also responds to eBS1 with an IPT-Notification Ack message. Upon receipt of the IPT-Notification Ack message, eBS1 stops timer $T_{not-ipt}$.

Next, at time h, eBS1 sends an IPT-Notification message to eBS2 with an indication of Global Close and starts timer $T_{not-ipt}$. Finally, upon receipt of this IPT-Notification message, eBS2 responds with an IPT-Notification Auk message at time i. It then can also immediately release any resources allocated for the AT. Upon receipt of the IPT-Notification Ack message, eBS1 stops timer $T_{not-ipt}$.

Figure 12:
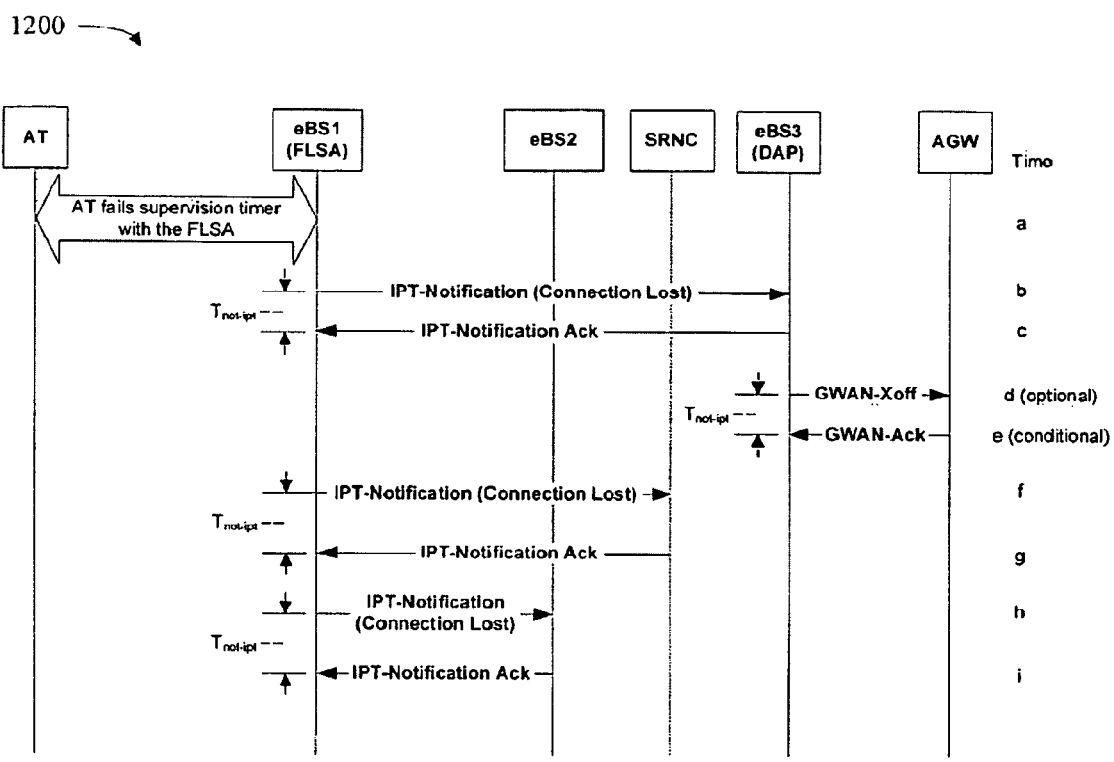
FIG. 12 is a process flow diagram that illustrates a non-graceful connection close for a connection between an access terminal and a base station.

FIG. 12 is a process flow diagram 1200 that illustrates a non-graceful connection close for a connection between an access terminal and a base station. Specifically, diagram 1200 illustrates a procedure in which an AT loses connection with the FLSE. At time a, the AT fails the air-link supervision timer at eBS1, which is the FLSE. Further, eBS1 has not received an IPT-Notification message with an indication that another eBS is now the FLSE. eBS1 starts an internal timer to release all resources it has allocated for the AT. Next, upon detecting that the AT has failed the supervision timer, eBS1 sends IPT-Notification messages with Connection Lost indications to all ANRIs in the Route Set as described at times b through i. It should be appreciated that the actions at times b through i can occur in parallel.

At time b, eBS1 sends an IPT-Notification message to eBS3 with an indication of Connection Lost and starts timer $T_{not-ipt}$. Next, upon receipt of the IPT-Notification message with the Connection Lost indication, eBS3 enters paging mode at time c such that it will send. a IAS-Paging Request message to the SRNC whenever it receives IP packets for the AT. Further, eBS3 can respond to eBS1 with an IPT-Notification Ack message. In addition, eBS3 can release any over-the-air resources it has provided to the AT. Upon receipt of the IPT-Notification Ack message, eBS1 stops timer $T_{not-ipt}$. At time d, if the DAP cannot buffer data for idle ATs, then eBS3 sends a GWAN-Xoff message to the AGW. Upon sending the GWAN-Xon message, eBS3 starts timer $T_{ack-gwan}$. Next, at time e, upon receipt of the GWAN-Xoff message, the AGW sends a GWAN-Ack message to eBS3. Upon receipt of the GWAN-Ack message, eBS3 stops timer $T_{ack-gwan}$. At. time f, eBS1 sends an IPT-Notification message to the SRNC with an indication of Connection Lost and starts timer $T_{not-ipt}$. Upon receipt of the IPT-Notification message, the SRNC enters idle mode at time g and uses the identity of eBS1 and the current time to determine the paging behavior. The SRNC also responds to eBS1 with an IPT-Notification Ack message. Upon receipt of the IPT-Notification Ack message, eBS1 stops timer $T_{not-ipt}$. eBS1 then sends an IPT-Notification message to eBS2 at time h with an indication of Connection Lost and starts timer $T_{not-ipt}$. Finally, upon receipt of the IPT-Notification message with the Connection Lost indication, eBS2 responds with an IPT-Notification Ack message at time i. It also release any resources allocated for the AT. Upon receipt of the IPT-Notification Ack message, eBS1 stops timer $T_{not-ipt}$.

Figure 13:
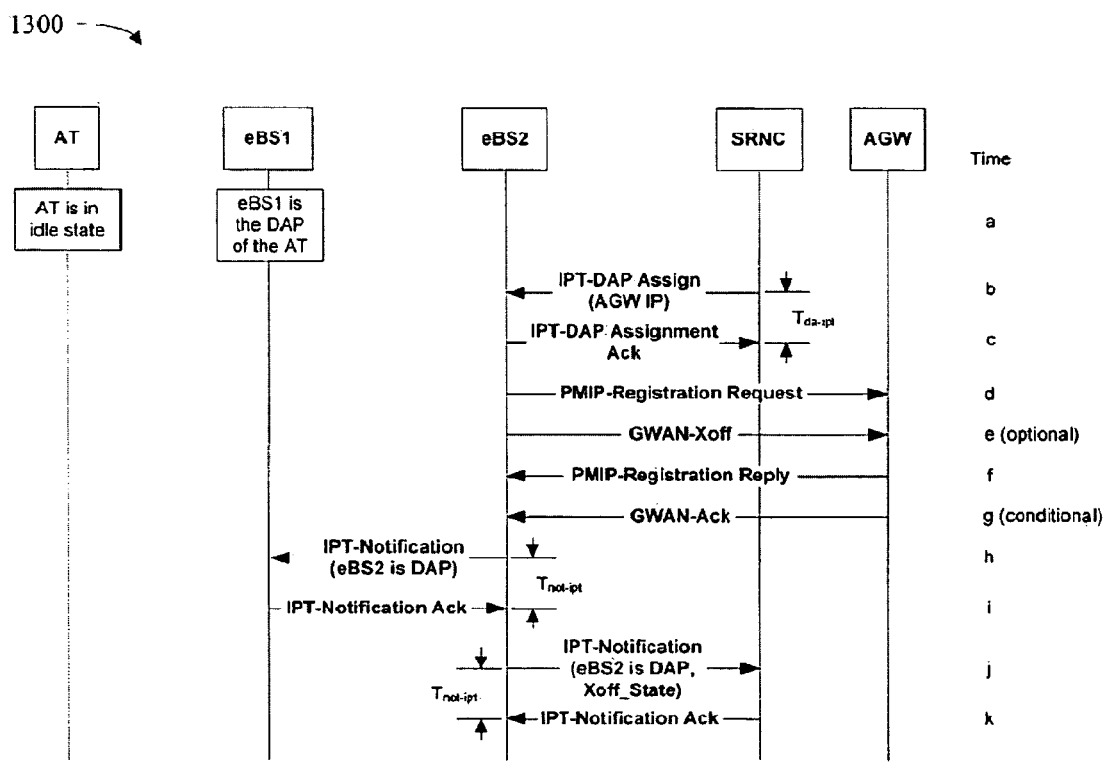
FIG. 13 is a process flow diagram that illustrates a data attachment point handoff for an access terminal.

FIG. 13 is a process flow diagram 1300 that illustrates a data attachment point handoff for an access terminal. Specifically, diagram 1300 illustrates a process in which an AT is in an idle state and the, SRNC decides, to move the DAP of the AT to another eBS. It is assumed in diagram 1300 that eBS1 is the DAP when the AT closes its connection. At time a, the AT is in idle state and eBS1 is the DAP of the AT. Next, at time b, the SRNC decides to move the DAP for the AT to eBS2. In one example, the SRNC takes care in moving the DAP in AT-assisted mode while the AT is idle. More particularly, if the AT has last received a DAPAssignment message from a SessionAnchor route before it went idle, then the SRNC can elect not to move the DAP while the AT is idle. The SRNC can further send an IPT-DAP Assignment message to eBS2 at time b with the identity of the source DAP (e.g. eBS1), an IP address of the AGW, and an optional flow control command. In addition, the SRNC can start timer $T_{da-ipt}$. Upon receipt of the IPT-DAP Assignment message, eBS2 sends an IPT-DAP Assignment Ack message to SRNC at time c. Upon receipt of the IPT-DAP Assignment Ack message, the SRNC stops timer $T_{da-ipt}$.

Next, at time d, eBS2 updates the Proxy Mobile Internet Protocol (PMIP) binding with the AGW by sending a PMIP-Registration Request message to the AGW. At time e, if eBS2 decides to perform flow control with the AGW to trigger the AGW to buffer packets for the AT, eBS2 sends a GWAN-Xoff message to the AGW. It should be appreciated that this step can occur at any time after time e. Next, at time f, the AGW confirms the binding update by sending a PMIP-Registration Reply message to eBS2 along with the lifetime of the tunnel. At lime g, if the GWAN-Xoff message is received at the AGW, then the AGW sends GWAN-Ack message back to eBS2.

Upon receipt of the PMIP-Registration Reply message, eBS2 sends an IPT-Notification message to die SRNC and the previous DAP Of the AT (e.g., eBS1) and starts timer $T_{not-ipt}$ at time h. The message indicates that eBS2 is now the current DAP. The message also contains the timestamp that eBS2 used in updating the PMIP tunnel with the AGW. Upon receipt of the IPT-Notification message, eBS1 responds with an IPT-Notification Ack message at time i. At this time, eBS1 can also release any resources related to the AT. Upon receipt of the IPT-Notification Ack message, eBS2 stops timer $T_{not-ipt}$. Next, at time j, eBS2 sends an IPT-Notification message to the SRNC and starts timer $T_{not-ipt}$. The message indicates that eBS2 is now the current DAP. In. one example, eBS2 can include an Xoff flow control status in the IPT-Notification message to the SRNC. The message can also contain the timestamp that eBS2 used in updating the PMIP tunnel with the AGW. Finally, at time k, the SRNC responds with an IPT-Notification Ack message. Further, eBS2 stops timer $T_{not-ipt}$.

Figure 14:
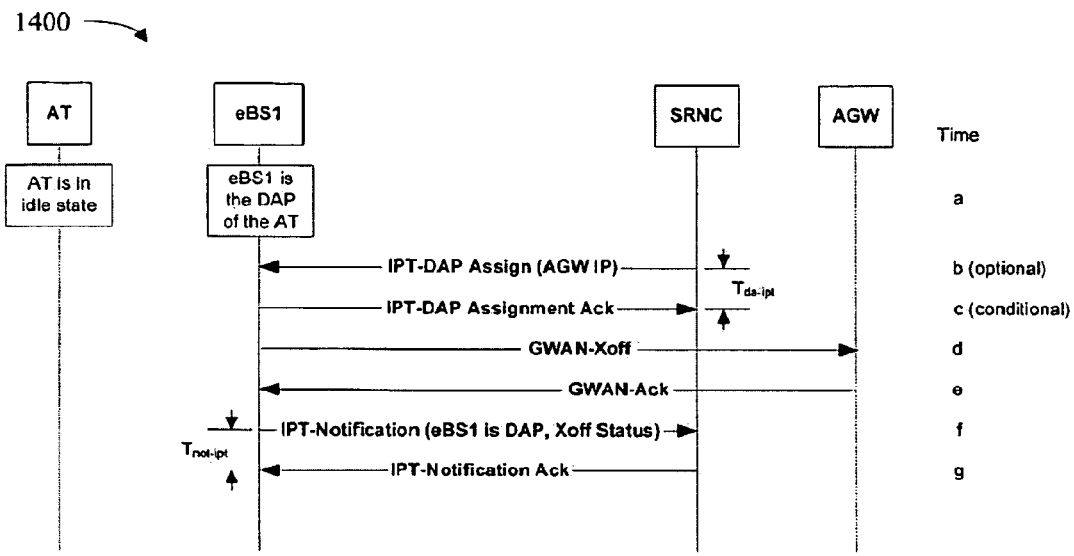
FIG. 14 is a process flow diagram that illustrates initiation of data buffering at an access gateway.

FIG. 14 is a process flow diagram 1400 that illustrates initiation of data buffering at an access gateway. Specifically, diagram 1400 illustrates a process in which the AT is in an idle state and either the DAP or the SRNC decides to buffer data in the AGW. The process begins at time a, where the AT is in idle state and eBS1 is the DAP of the AT. Next, at time b, if the SRNC. decides to trigger data buffering in the AGW, then the SRNC sends an IPT-DAP Assignment message to the DAP (e.g., eBS1) with the IP address of the AGW address and a flow control command. The SRNC can further start timer $T_{da-ipt}$.

Upon receipt of the IPT-DAP Assignment message, eBS1 sends an IPT-DAP Assignment Ack message to SRNC at time c. Upon receipt of the IPT-DAP Assignment Ack message, the SRNC stops timer $T_{da-ipt}$. Next, at time d, eBS1 triggers the AGW to buffer packets for the AT. eBS1 additionally sends a GWAN-Xoff message to the AGW. At time e, if the GWAN-Xoff message is received at the AGW, then the AGW sends a GWAN-Ack message back to eBS1. eBS1 then sends an IPT-Notification message to the SRNC and starts timer $T_{not-ipt}$, at time f. The message indicates that eBS1 is now the current DAP. The message also contains the latest flow control status with the AGW. Upon receipt of the IPT-Notification message, the SRNC responds at time g with an IPT-Notification Ack message. Upon receipt of the IPT-Notification Ack message, eBS1 stops timer $T_{not-ipt}$.

Figure 15:
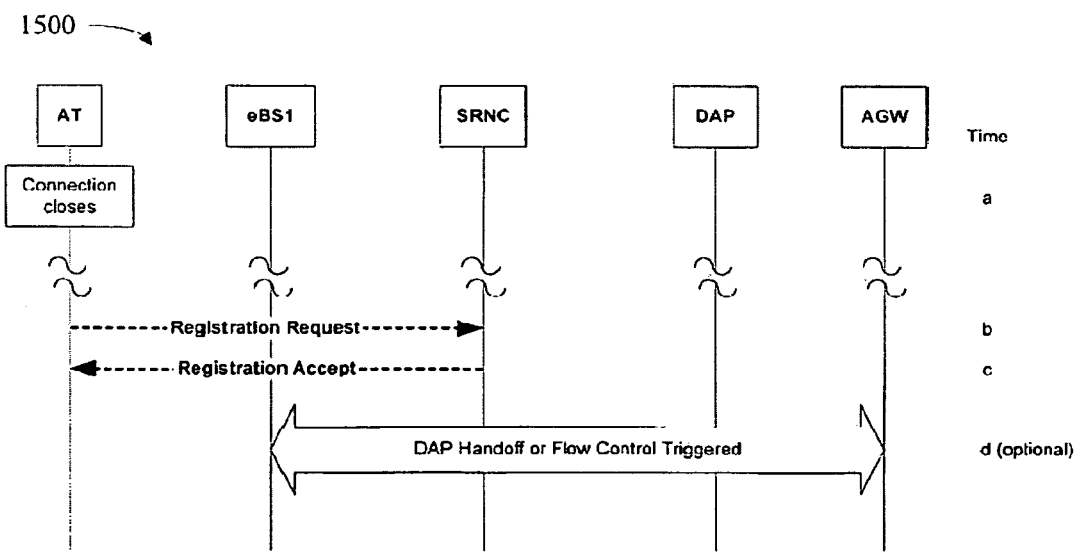
FIG. 15 is a process flow diagram that illustrates registration between an access terminal and a base station via a session reference network controller.

FIG. 15 is a process flow diagram 1500 that illustrates registration between an access terminal and a base station via a session reference network controller. Specifically, diagram 1500 illustrates a process wherein the AT performs registration with the SRNC through an eBS that is supported by the SRNC. The process can begin at time a, wherein a connection between the AT and the FLSE closes. In one example, the connection can close as described in diagrams 1100 and/or 1200 above. Next, at time b, registration from the AT is triggered based on a Session Anchor Route configuration. The AT sends a Registration Request message to the SRNC via the Link Layer Tunneling (LLT) tunnel from the local eBS (e.g., eBS1). Upon receipt of the tunneled Registration Request message, the SRNC updates its paging area for the AT at time c and accepts the registration request by sending a Registration Accept message back to the AT. This message is tunneled via the LLT tunnel to eBS1. Finally, after time c, if the SRNC determines that the AGW should buffer the data or the DAP should be moved to another eBS, the SRNC can initiate a DAP Handoff and/or flow control procedure at time d as described with regard to diagrams 1300 and/or 1400. For example, the AT can be configured with a small registration radius around the DAP and has moved out of the area. Therefore, DAP may choose to send a trigger to the AGW to buffer future packets.

Figure 16:
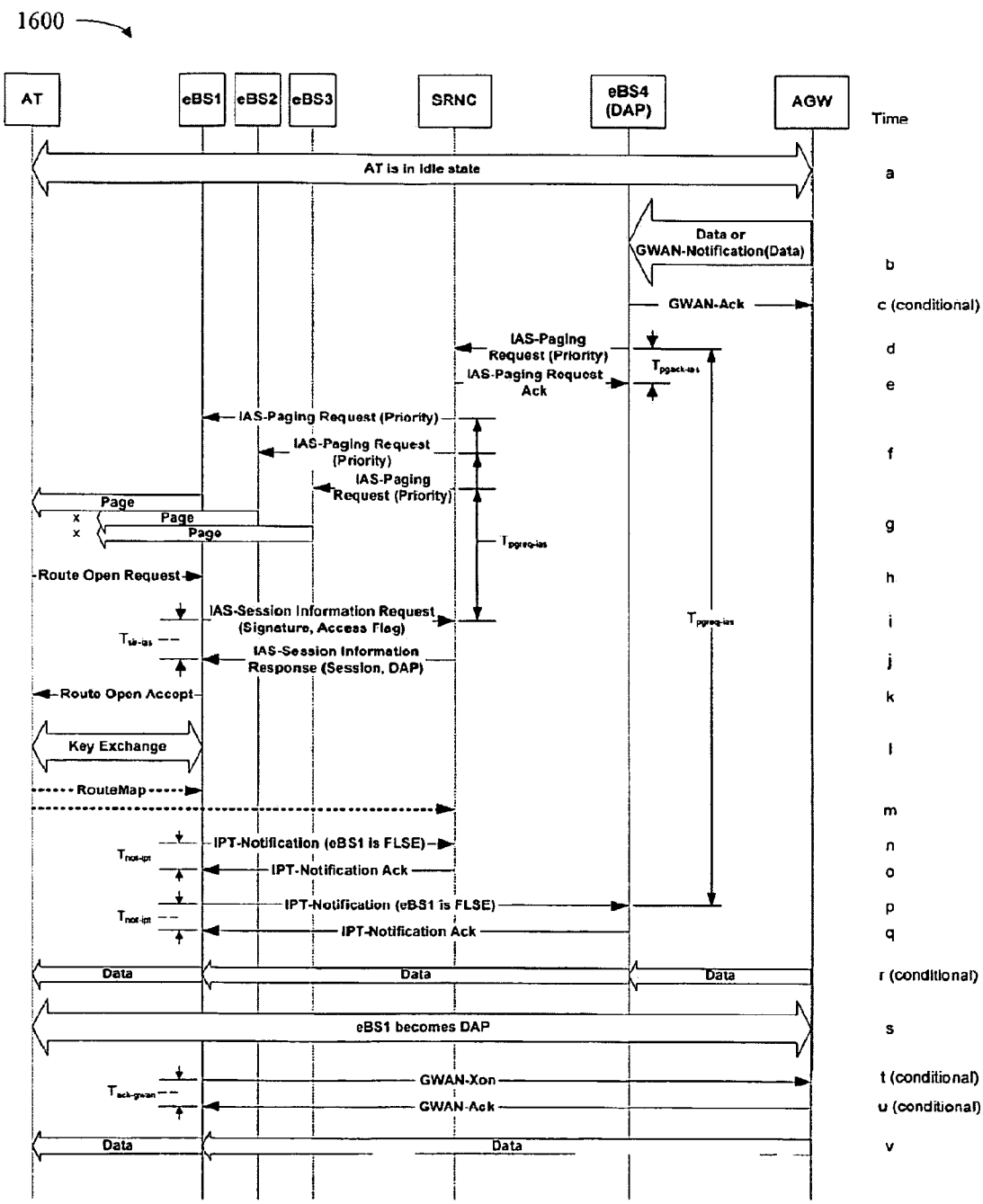
FIG. 16 is a process flow diagram that illustrates paging in a wireless communication system.

FIG. 16 is a process flow diagram 1600 that illustrates paging in a wireless communication system. Specifically, the process illustrated by diagram 1600 can be used to page an AT when the AT is idle. At time a, a connection between the AT and the FLSE can be closed. Accordingly, the AT, SRNC and eBS4 (DAP) can all be in an idle state. In one example, eBS4 may have performed flow control to trigger the AGW to buffer data as illustrated in diagram 1400. Next, at time b, eBS4 is triggered to page the AT, either by receiving data for the AT from the AGW or by receiving a GWAN-Notification message with an indication that the AGW has data for the AT. At time c, if eBS4 receives a GWAN-Notification message, then eBS4 responds to the AGW with GWAN-Ack message.

At time d, eBS4 can then send an IAS-Paging Request message to the SRNC with the priority of the page, the status of flow control at the AGW, a flag indicating that the paging area is unknown, and an indication that a provisional acknowledgment is required. eBS4 starts timer $T_{pgack-ias}$ and waits for the provisional acknowledgement. In addition, eBS4 also starts timer $T_{pgreq-ias}$ to await the arrival of an IAS-Paging Response message. Upon receipt of the IAS-Paging Request message, the SRNC responds with an IAS-Paging Request Ack message to eBS4 at time e. Upon receipt of the IAS-Paging Request Ack message, eBS4 stops timer $T_{pgack-ias}$ and no longer attempts to send another IAS-Paging Request message to the SRNC when subsequent data arrives until timer $T_{pgreq-ias}$ expires.

The SRNC then sends an IAS-Paging Request message to each eBS in the paging area of the AT at time f. In one example, it can be assumed that eBS1, eBS2 and eBS3 are in the paging area. The IAS-Paging Request message sent at time f contains an indication that this is a paging request only on the receiving eBS. The message can also contain information on the time for initiating the paging procedure over the air, priority of the page request, and an indication that a provisional acknowledgment is not required. The SRNC starts an instance of timer $T_{pgreq-ias}$ for each paging request message sent. Next, at time g, eBS1, eBS2 and eBS3 page the AT at the specified channel and time.

It is assumed in diagram 1600 that the AT receives the page sent by eBS1. Accordingly, the AT can respond to the page at time h by performing an access procedure. For example, the AT can send a Route Open Request message to eBS1 to open a route with eBS1. At time i, upon receipt of the Route Open Request message, eBS1 sends an IAS-Session Information Request message with a flag indicating access to the SRNC to requests a copy of the session and starts timer $T_{sir-ias}$. Upon receipt of the IAS-Session information Request message with an access flag, the SRNC, stops timer $T_{pgreq-ias}$.

The SRNC sends an IAS-Session Information Response message to eBS1 at time j that includes the session information and the ANID of eBS4, which is the DAP of the AT. Upon receipt of the IAS-Session Information Response message, eBS1 stops timer $T_{sir-ias}$. At time k, eBS1 then sends a RouteOpenAccept message to the AT to complete route establishment with the AT. At time l, eBS1 completes a Key Exchange procedure with the AT. It should be appreciated that this action can occur in parallel with the act described at time k. Next, at time m, the AT updates the Route Map with both eBS1 and the SRNC.

After sending the RouteOpenAccept message to the AT at time k, eBS1 notifies all ANRIs in the route set and eBS4, now the previous DAP of the AT, that it has become the FLSE for the AT. Accordingly, at time n, eBS1 sends an IPT-Notification message to eBS4 based on the ANID of eBS4 indicating that eBS1 is the FLSE for the AT. eBS1 also starts timer $T_{not-ipt}$. Upon receipt of the IPT-Notification message, eBS4 acknowledges with an IPT-Notification Ack message to eBS1 at time o. eBS4 also stops timer $T_{pgreq-ias}$ and enters a connected state. Further, upon receipt of the IPT-Notification Ack message, eBS1 stops timer $T_{not-ipt}$. Based on the ANID of eBS4, eBS1 sends an IPT-Notification message to eBS4 at time p indicating that eBS1 is the FLSE of the AT. eBS1 also starts timer $T_{not-ipt}$. Upon receipt of the IPT-Notification message, eBS4 acknowledges with an IPT-Notification Ack message to eBS1 at time q. eBS4 also stops timer $T_{pgrep-ias}$ and enters a connected state. Upon receipt of the IPT-Notification Ack message, eBS1 again stops timer $T_{not-ipt}$.

At time r, if the AGW does not buffer the data or eBS4 has data for the AT, data in eBS4 is forwarded to the AT through eBS1, which is now the FLSE for the AT. At time s, eBS1, which is the FLSE for the AT, additionally becomes the DAP for the AT. It should be appreciated that this act can occur anytime after time k. Next, at time t, if the status of flow control with the AGW is in Xoff state, then eBS1 sends a GWAN-Xon message to the AGW to request the AGW to start sending data through a PMIP tunnel. Upon sending the GWAN-Xon message, eBS1 starts timer $T_{ack-gwan}$. Upon receipt of the GWAN-Xon message, the AGW can forward data packets through PMIP tunnel to eBS1 at time u. The AGW also sends GWAN-Ack message to eBS1. Upon receipt of the GWAN-Ack message, eBS1 stops timer $T_{ack-gwan}$. After the act described at time u, the process can conclude at time v, wherein data from the AGW is forwarded to eBS1, which is now the DAP for the AT.

Figure 17:
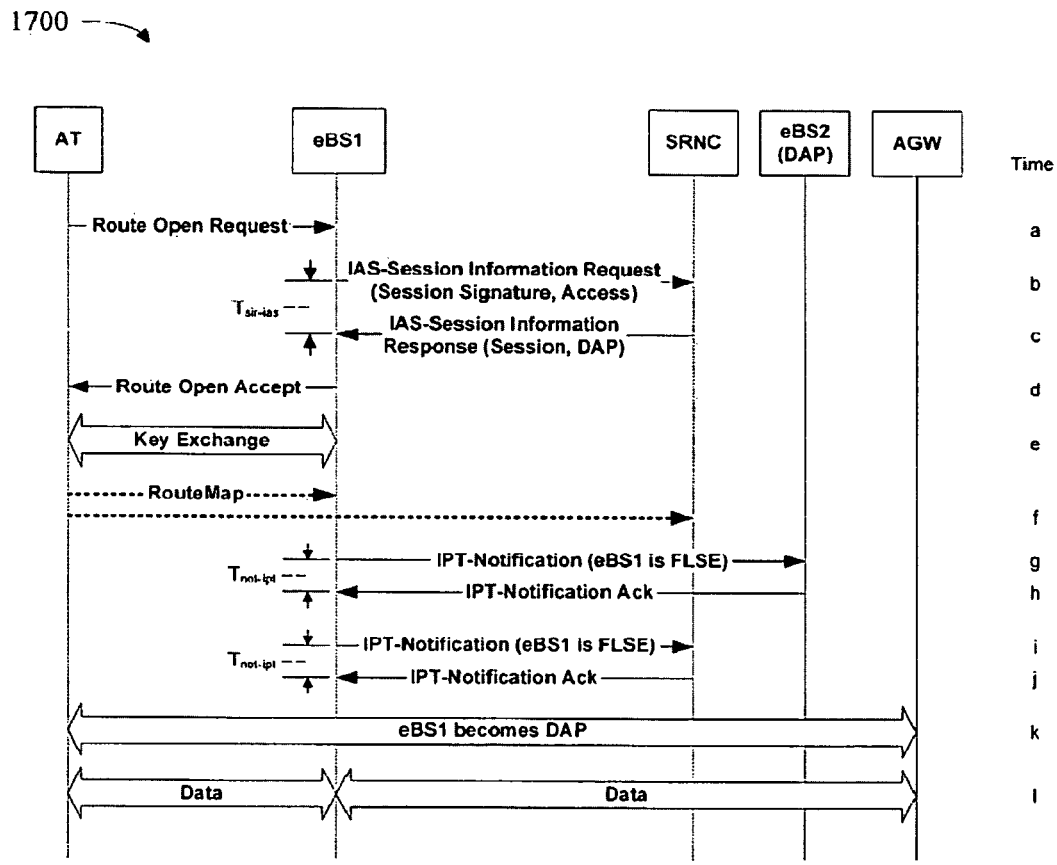
FIG. 17 is a process flow diagram that illustrates a call re-activation by an idle access terminal.

FIG. 17 is a process flow diagram 1700 that illustrates a call re-activation by an idle access terminal. Specifically, diagram 1700 illustrates a process by which the AT independently re-enters active mode from an idle state. The process begins at time a, wherein the AT sends a Route Open Request message to eBS1 to open a route with eBS1. Upon receipt of the Route Open Request message, eBS1 sends an IAS-Session Information Request message at time b with a flag indicating access to the SRNC to request a copy of the session. Further, eBS1 starts timer $T_{sir-ias}$. Next, at time c, the SRNC sends an IAS-Session Information Response message to eBS1 including the session information and the ANID of the DAP of the AT. Upon receipt of the IAS-Session Information Response message, eBS1 stops timer $T_{sir-ias}$. At time d, eBS1 sends a Route Open Accept message to the AT to complete route establishment with the AT. Next, at time e, eBS1 completes a Key Exchange procedure with the AT. It should be appreciated that this action can occur in parallel with the act described at time d. At time f, the AT then updates the Route Map with both eBS1 and the SRNC.

After sending RouteOpenAccept message to the AT, eBS1 notifies all ANRIs in the route set and the previous DAP of the AT that it has become the FLSE for the AT. Accordingly based on the ANID of eBS2, which is the DAP for the AT, eBS1 sends an IPT-Notification message to eBS2 at time g indicating that eBS1 is the FLSE of the AT. eBS1 also starts timer $T_{not-ipt}$. Upon receipt of the IPT-Notification message, eBS2 acknowledges with an IPT-Notification Ack. message to eBS1 at time h. Upon receipt of the IPT-Notification Ack message, eBS1 stops timer $T_{not-ipt}$. Next, at time i, eBS1 sends an IPT-Notification message to the SRNC indicating that eBS1 is the FLSE. In addition, eBS1 again starts timer $T_{not-ipt}$. Upon receipt of the IPT-Notification message, the SRNC acknowledges with an IPT-Notification Ack message to eBS1 at time j. Upon receipt of the IPT-Notification Ack message, eBS1 again stops timer $T_{not-ipt}$. At time k, the DAP is moved to eBS1, which is the FLSE for the AT. Finally, at time l, data can be exchanged between the AT and the AGW.

Figure 18:
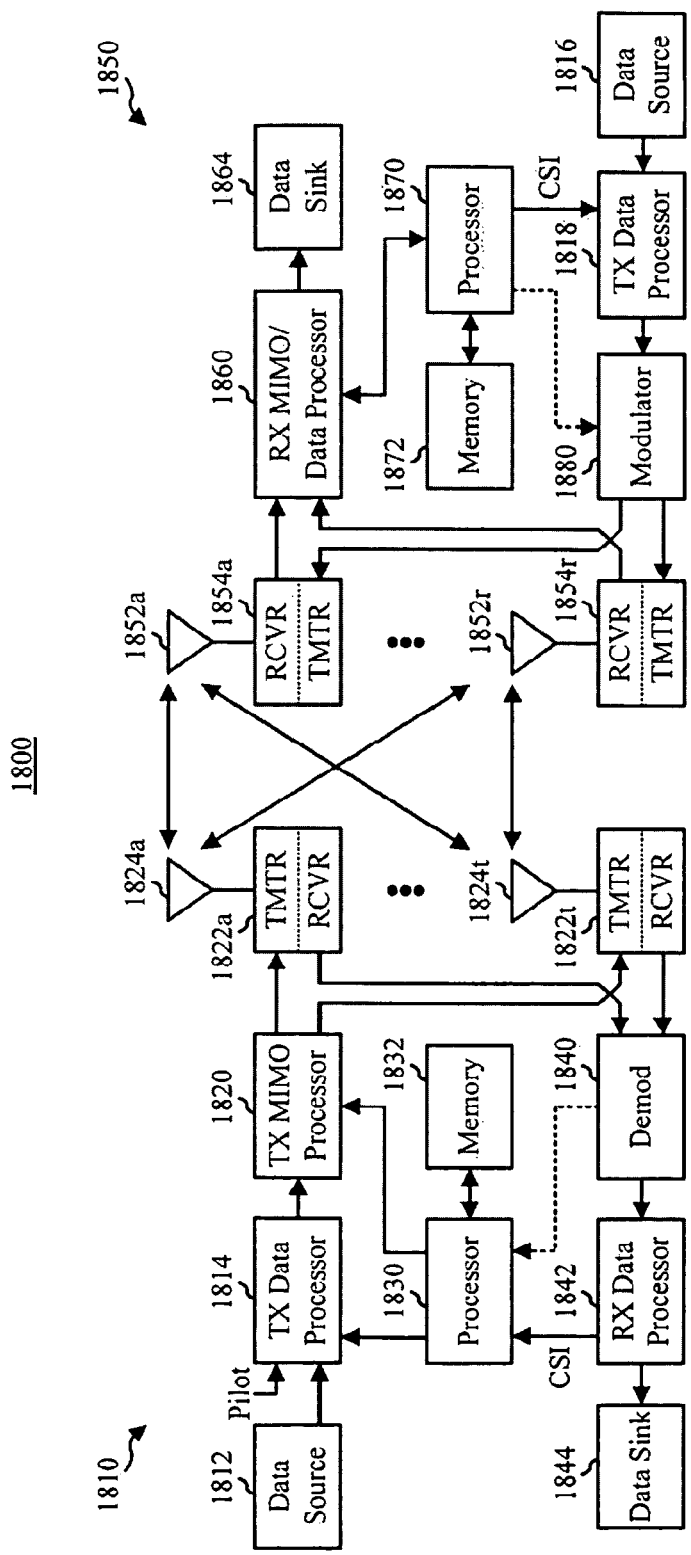
FIG. 18 is a block diagram illustrating an example wireless communication system in which one or more embodiments described herein may function.

Referring now to FIG. 18, a block diagram illustrating an example wireless communication system 1800 in which one or more embodiments described herein may function is provided. In one exam pie, system 1800 is a multiple-input multiple-output (MIMO) system that includes a transmitter system 1810 and a receiver system 1850. It should be appreciated, however, that transmitter system 1810 and/or receiver system 1850 could also be applied to a multi-input single-output system wherein, for example, multiple transmit antennas (e.g., on a base station), may transmit one or more symbol streams to a single antenna device (e.g., a mobile station). Additionally, it should be appreciated that aspects of transmitter system 1810 and/or receiver system 1850 described herein could be utilized. in connection with a single output to single input antenna system.

In accordance with one aspect, traffic data for a number of data streams are provided at transmitter system 1810. from a data source 1812 to a transmit (TX) data processor 1814. In one example, each data stream can then be transmitted via a respective transmit antenna 1824. Additionally, TX data processor 1814 can format, code, and interleave traffic data for each data stream based on a particular coding scheme selected for each respective data stream in order to provide coded data. In one example, the coded data for each data stream may then be multiplexed with pilot data using OFDM techniques. The pilot data can be, for example, a known data pattern that is processed in a known manner. Further, the pilot data may be used at receiver system 1850 to estimate channel response. Back at transmitter system 1810, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream may be determined by instructions performed on and/or provided by processor 1830.

Next, modulation symbols for all data streams can be provided to a TX processor 1820, which may further process the modulation symbols (e.g., for OFDM). TX MIMO processor 1820 may then provides $N_T$ modulation symbol streams to $N_T$ transceivers 1822a through 1822t. In one example, each transceiver 1822 can receive and process a respective symbol stream to provide one or more analog signals. Each transceiver 1822 may then further condition (e.g., amplify, filter, and upconvert) the analog signals to provide a modulated signal suitable for transmission over a MIMO channel. Accordingly, $N_T$ modulated signals from transceivers 1822a through 1822t can then be transmitted from $N_T$ antennas 1824a through 1824t, respectively.

In accordance with another aspect, the transmitted modulated signals can be received at receiver system 1850 by $N_R$ antennas 1852a through 1852r. The received signal from each antenna 1852 can then be provided to respective transceivers 1854. In one example, each transceiver 1854 can condition (e.g., filter, amplify, and downconvert) a respective received signal, digitize the conditioned signal, to provide samples, and then processes the samples to provide a corresponding "received" symbol stream. An RX MIMO/data processor 1860 can then receive and process the $N_R$ received symbol streams from $N_R$ transceivers 1854 based on a particular receiver processing technique to provide $N_T$ "detected" symbol streams. In one example, each detected symbol steam call include symbols that are estimates of the modulation symbols transmitted for the corresponding data stream. RX processor 1860 can then process each symbol stream at least in part by demodulating, deinterleaving, and decoding each detected symbol stream to recover traffic data for a corresponding data stream. Thus, the processing by RX processor 1860 may be complementary to that performed by TX MIMO processor 1820 and TX data processor 1814 at transmitter system 1810. RX processor 1860 may additionally provide processed symbol streams to a data sink 1864.

In accordance with one aspect, the channel response estimate generated by RX processor 1860 may be used to perform space/time processing at the receiver, adjust power levels, change modulation rates or schemes, and/or other appropriate actions. Additionally, RX processor 1860 may further estimate channel characteristics such as, for example, signal-to-noise-and-interference ratios (SNRs) of the detected symbol streams. RX processor i860 can then provide estimated channel characteristics to a processor 1870. In one example, RX processor 1860 and/or processor 1870 can further derive an estimate of the "operating" SNR for the system. Processor 1870 can then provide channel state information (CSI), which may comprise information regarding the communication link and/or the received data stream. This information may include, for example, the operating SNR. The CSI can then be processed by a TX data processor 1818, modulated by a modulator 1880, conditioned by transceivers 1854a through 1854r, and transmitted back to transmitter system 1810. In addition, a data source 1816 at receiver system 1850 may provide additional data to be processed by TX data processor 1818.

Back at transmitter system 1810, the modulated signals from receiver system 1850 can then be received by antennas 1824, conditioned by transceivers 1822, demodulated by a demodulator 1840, and processed by a RX data processor 1842 to recover the CSI reported by receiver system 1850. In one example, the reported CSI can then be provided to processor 1830 and used to determine data rates as well as coding and modulation schemes to be used for one or more data streams. The determined coding and modulation schemes can then be provided to transceivers 1822 for quantization and/or use in later transmissions to receiver system 1850. Additionally and/or alternatively, the reported CSI can be used by processor 1830 to generate various controls for TX data processor 1814 and TX MIMO processor 1820. In another example, CSI and/or other information processed by RX data processor 1842 call be provided to a data sink 1844.

In one example, processor 1830 at transmitter system 1810 and processor 1870 at receiver system 1850 direct operation at their respective systems. Additionally, memory 1832 at transmitter system 1810 and memory 1872 at receiver system 1850 can provide storage for program codes and data used by processors 1830 and 1870, respectively. Further, at receiver system 1850, various processing techniques may be used to process the $N_R$ received signals to detect the $N_T$ transmitted symbol streams. These receiver processing techniques can include spatial and space-time receiver processing techniques, which may also be referred to as equalization techniques, and/or "successive nulling/equalization and interference cancellation" receiver processing techniques, which may also be referred to as "successive interference cancellation" or "successive cancellation" receiver processing techniques.

Figure 19:
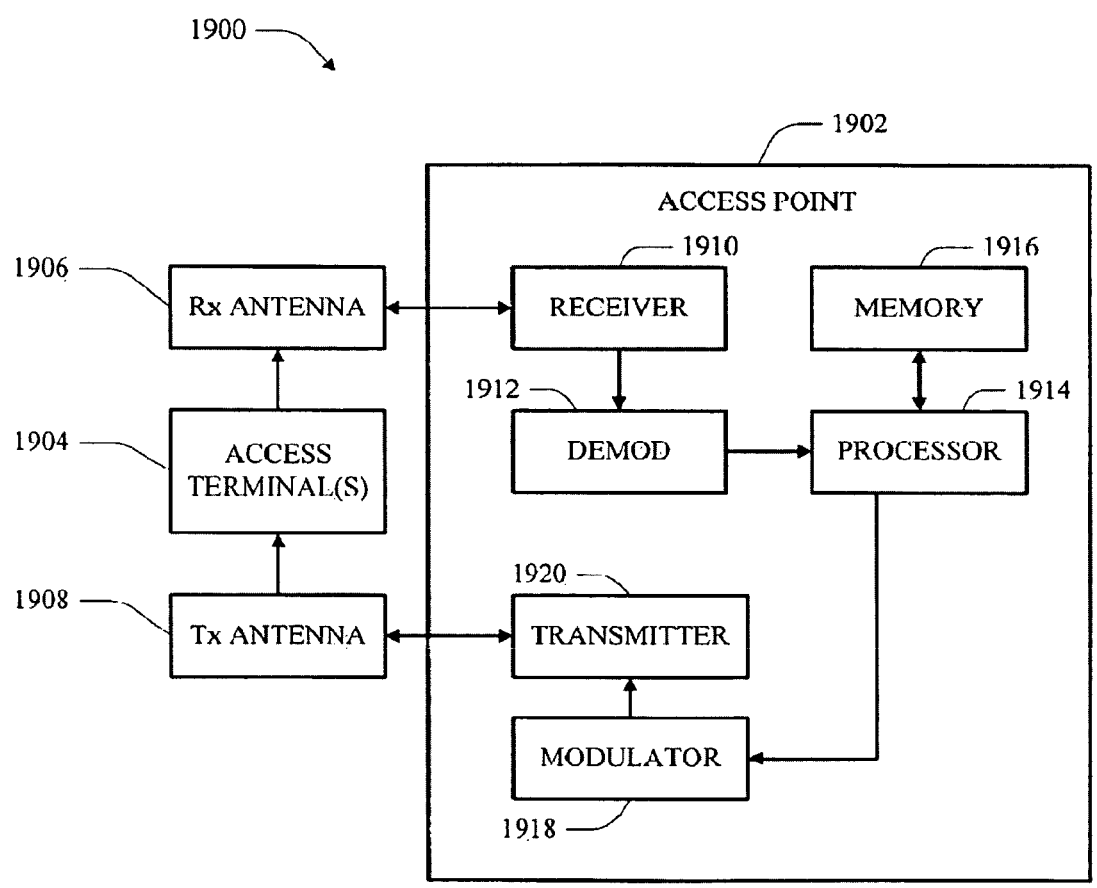
FIG. 19 is a block diagram of a system that coordinates data communication from an access gateway to a terminal in accordance with various aspects.

FIG. 19 is a block diagram of a system 1900 that coordinates data communication from an access gateway to an access terminal 1904 in accordance with various aspects described herein. In one example, system 1900 includes a base station or access point 1902. As illustrated, access point 1902 can receive signal(s) from one or more access terminals 1904 and/or an access gateway (not shown) via a receive (Rx) antenna 1906 and transmit to the one or more access terminals 1004 and/or the access gateway via a transmit (Tx) antenna 1908.

Additionally, access point 1902 can comprise a receiver 1910 that receives information from receive antenna 1906. In one example, the receiver 1910 can be operatively associated with a demodulator (Demod) 1912 that demodulates received information. Demodulated symbols can. then be analyzed by a processor 1914. Processor 1914 can be coupled to memory 1916, which can store information related to code clusters, access terminal assignments, lookup tables related thereto, unique scrambling sequences, and/or other suitable types of information. In one example, access point 1902 can employ processor 1914 to perform methodologies 500, 600, 700, and/or other similar and appropriate methodologies. Access point 1902 can also include a modulator 1918 that can multiplex a signal for transmission by a transmitter 1920 through transmit antenna 1908.

Figure 20:
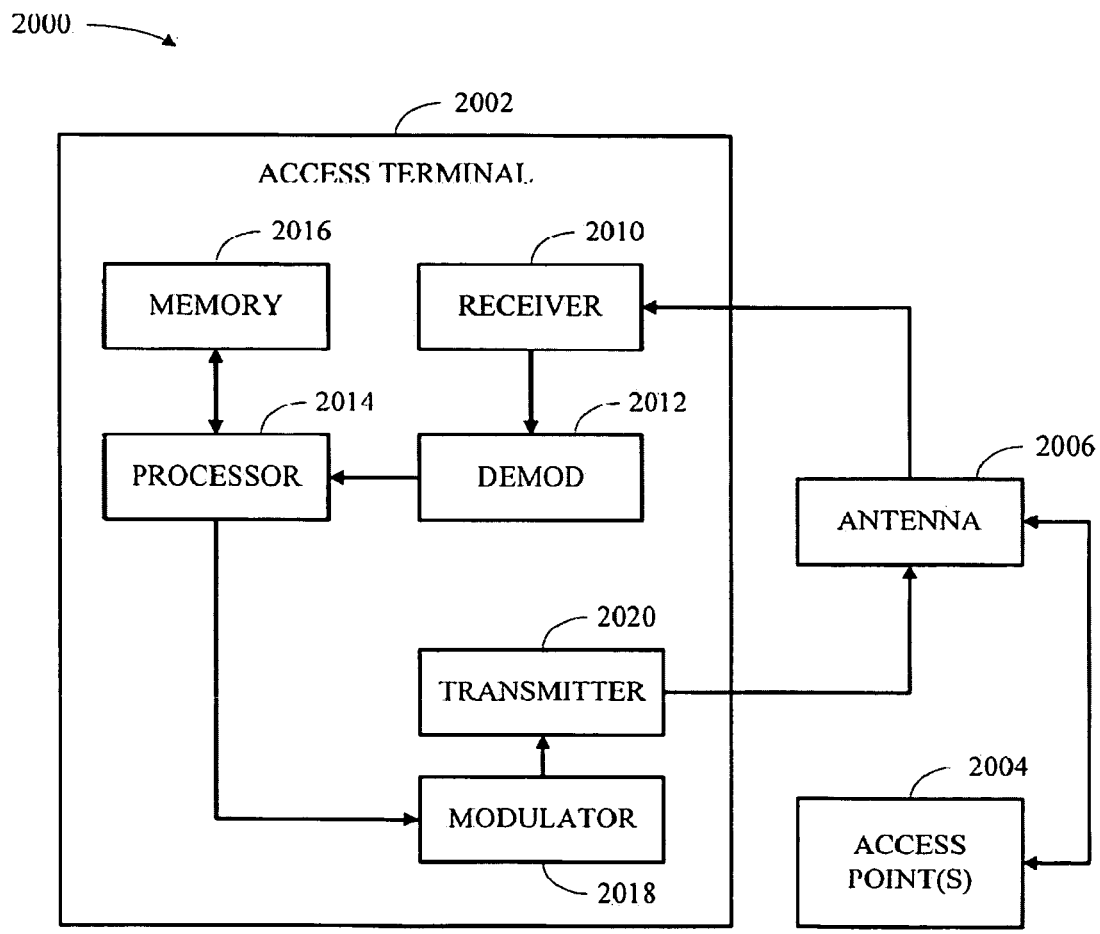
FIG. 20 is a block diagram of a system that facilitates registering with one or more data attachment points and receiving data from an access gateway in accordance with various aspects.

FIG. 20 is a block diagram of a system 2000 that facilitates registering with one or more data attachment points and receiving data from an access gateway in accordance with various aspects described herein. In one example, system 2000 includes an access terminal 2002. As illustrated, access terminal 2002 can receive signal(s) from one or more access points 2004 and transmit to the one or more access points 2004 via an antenna 2008. Additionally, access terminal 2002 can comprise a receiver 2010 that receives information from antenna 2008. In one example, receiver 2010 can be operatively associated with a demodulator (Demod) 2012 that demodulates received information. Demodulated symbols can then be analyzed by a processor 2014. Processor 2014 can be coupled to memory 2016, which can store data and/or program codes related to access terminal 2002. Additionally, access terminal 2002 can employ processor 2014 to perform methodology 800 and/or other similar and appropriate methodologies. Access terminal 2002 can also include a modulator 2018 that can multiplex a signal for transmission by a transmitter 2020 through antenna 2008.

Figure 21:
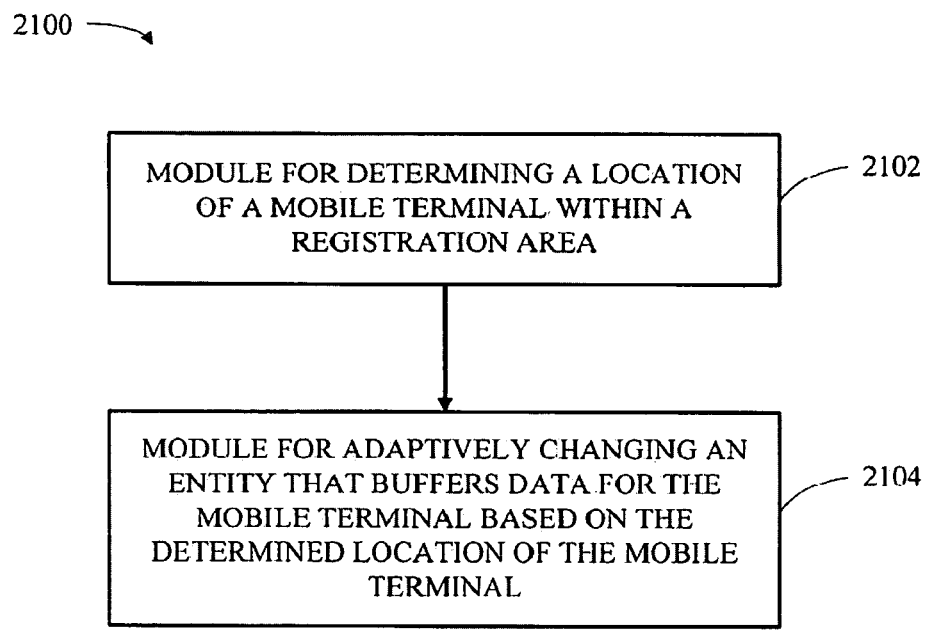
FIG. 21 is a block diagram of an apparatus that facilitates delay and backhaul-efficient data buffering in a wireless communication system.

FIG. 21 illustrates an apparatus 2100 that facilitates delay and backhaul-efficient data buffering in a wireless communication system (e.g., system 200). It is to be appreciated that apparatus 2100 is represented as including functional blocks, which can be functional blocks that represent functions implemented by a processor, software; or combination thereof (e.g., firmware). Apparatus 2100 can be implemented in a base station (e.g., an access network 30) and/or another suitable network entity and can include a module 2102 for determining a location of a mobile terminal within a registration area and a module 2104 for adaptively changing an entity that buffers data for the mobile terminal based on the determined location of the mobile terminal.

Figure 22:
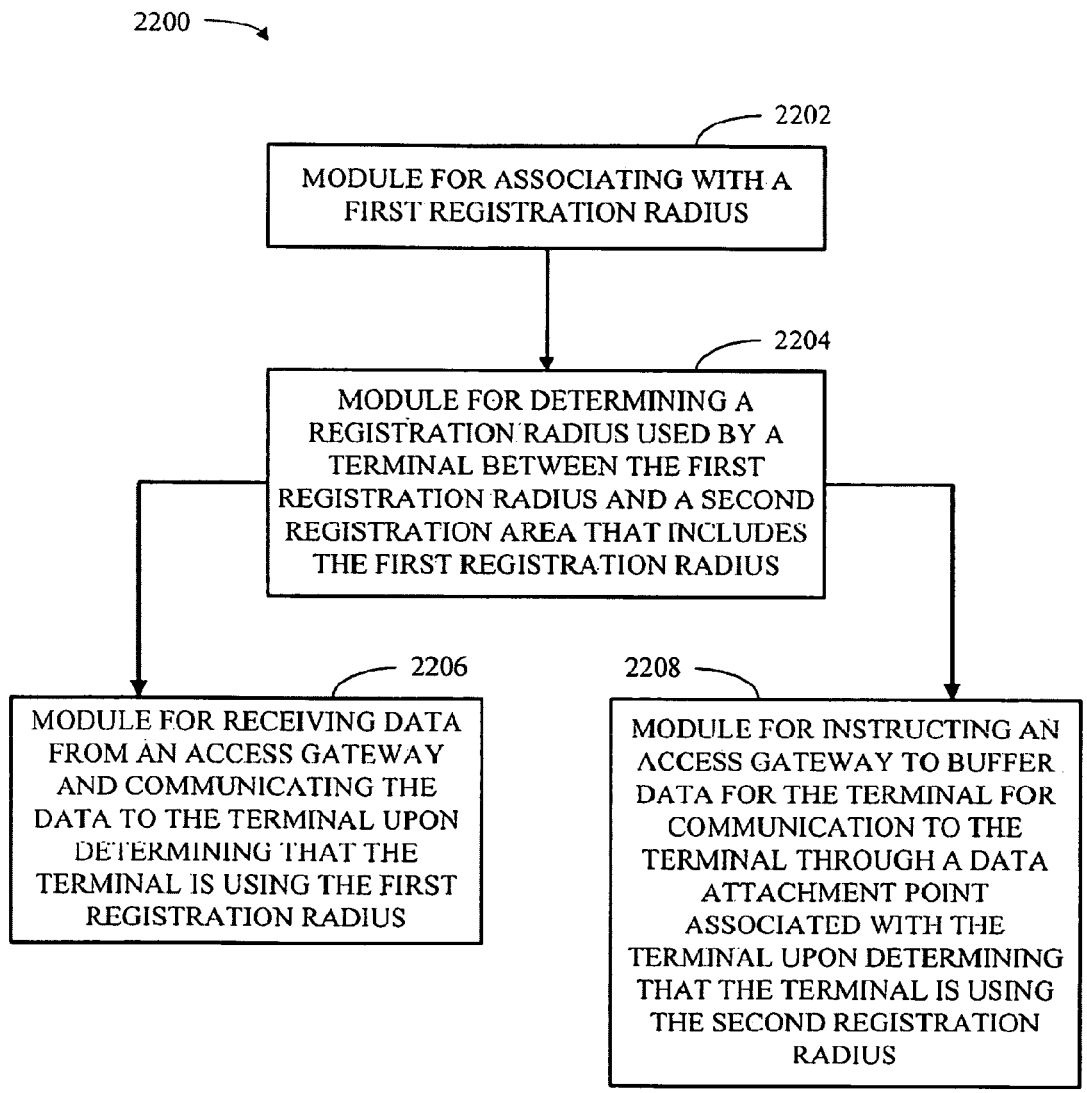
FIG. 22 is a block diagram of an apparatus that facilitates communication of data from an access gateway to a terminal based on a location of the terminal in a wireless communication system.

FIG. 22 illustrates an apparatus 2200 that facilitates communication of data from an access gateway (e.g., access gateway 10) to a terminal (e.g., access terminal 40) based on allocation of the terminal in a wireless communication system. It is to be appreciated that apparatus 2200. is represented as including functional blocks, which can be functional blocks that represent functions implemented by a processor, software, or combination thereof (e.g., firmware). Apparatus 2200 can be implemented in a base station and/or another suitable network entity and can include a module 2202 for associating with a first registration radius, a module 2204 for determining a registration radius used by a terminal between the first registration radius and a second registration area that includes the first registration radius, a module 2206 for receiving data from an access gateway and communicating the data to the terminal upon determining that the terminal is using the first registration radius, and a module 2208 for instructing an access gateway to buffer data for die terminal for communication to the terminal through a data attachment point associated with the terminal upon determining that the terminal is using the second registration radius.

Figure 23:
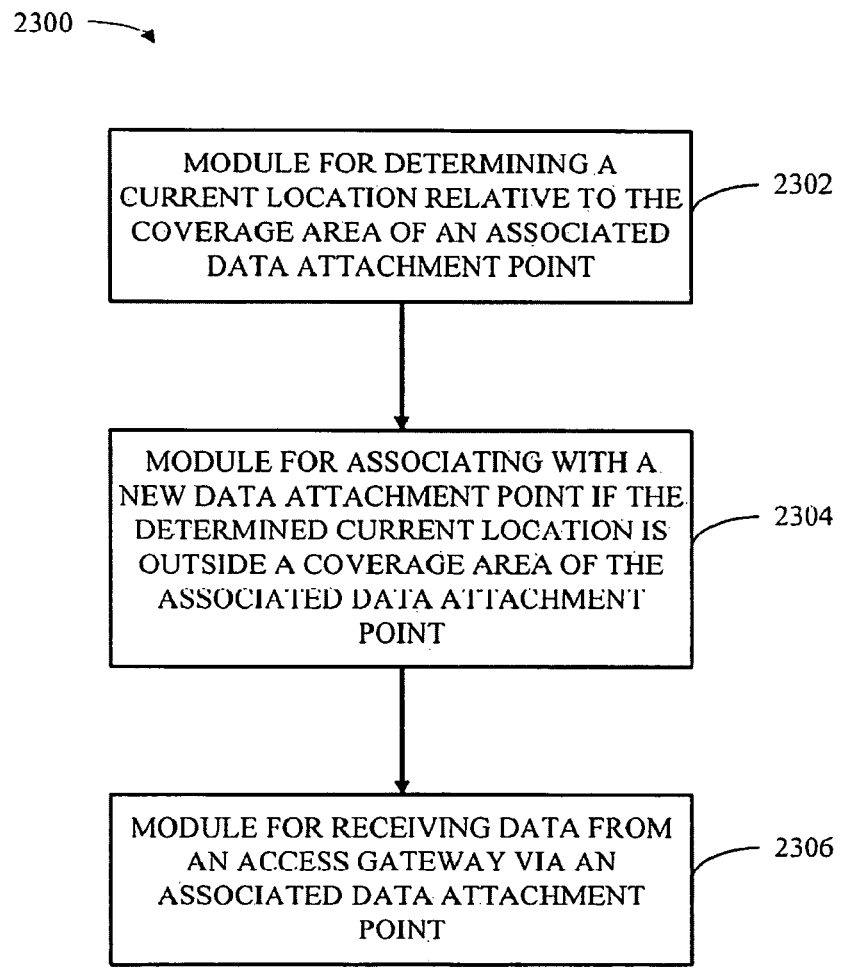
FIG. 23 is a block diagram of an apparatus that facilitates receiving data from an access gateway in a wireless communication system.

FIG. 23 illustrates an apparatus 2300 that facilitates receiving data from an access gateway in a wireless communication system. It is to be appreciated that apparatus 2300 is represented as including. functional blocks, which can be functional blocks that represent functions implemented by a processor, software, or combination thereof (e.g., firmware). Apparatus 2300 can be implemented in a terminal (e.g., access terminal 40) and/or another suitable network entity and can include a module 2302 for determining a current location relative to the coverage area of an associated data attachment point, a module 2304 for associating with a new data attachment point if the determined current location is outside a coverage area of the associated data attachment. point, and a module 2306 for receiving data from an access gateway via an associated data attachment point.

It is to be understood that the embodiments described herein may be implemented by hardware, software, firmware, middleware, microcode, or any combination thereof. When the systems and/.or methods are implemented in software, firmware, middleware or. microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes. of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to he inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for data buffering and paging in a wireless communication system, comprising:
    determining whether an access terminal is within a coverage area associated with a data attachment point; and
    sending a request from the data attachment point to an access gateway associated with the data attachment point to adaptively change a location at which data is buffered for the access terminal based at least in part on whether the access terminal is within the coverage area and based on recent activity level of the access terminal, wherein adaptively changing the location at which the data is buffered for the access terminal includes instructing the access gateway to buffer data for the access terminal upon determining that the access terminal has moved outside the coverage area associated with the data attachment point.

2. The method of claim 1, wherein a first registration radius corresponds to a data attachment point coverage area, wherein a second registration radius corresponds to an area larger than the data attachment point coverage area, and wherein a registration radius utilized by the access terminal changes from the first registration radius to the second registration radius when the access terminal moves outside the data attachment point coverage area.

3. The method of claim 2, further comprising receiving a request from a network element to become the data attachment point.

4. The method of claim 2, further comprising configuring the access terminal to register upon moving outside the data attachment point coverage area.

5. The method of claim 2, wherein an entity at the location that buffers data for the access terminal receives data from the access gateway for buffering upon determining that the access terminal has not moved outside the coverage area.

6. The method of claim 5, further comprising delivering the data received by the entity to the access terminal.

7. The method of claim 6, wherein the access terminal is in an idle state and wherein delivering the data received by the entity includes paging the access terminal.

8. The method of claim 7, wherein paging the access terminal includes:
    communicating a paging request to a session reference network controller (SRNC);
    receiving a paging response from the SRNC; and
    communicating a paging signal to the access terminal to enable the access terminal to enter an active state.

9. The method of claim 1, further comprising receiving a notification from the access gateway that data has been buffered by the access gateway for transmission to the access terminal.

10. The method of claim 9, further comprising communicating a paging request to a session reference network controller (SRNC) to facilitate delivery of the buffered data from the access gateway to the access terminal using an access network that provides coverage for a location of the access terminal.

11. The method of claim 1, wherein adaptively changing the location at which the data is buffered for the access terminal includes:
    identifying one or more applications utilized by the access terminal; and
    adaptively changing the location at which the data is buffered for the access terminal based at least in part on the one or more applications.

12. The method of claim 1, wherein adaptively changing the location at which the data is buffered for the access terminal includes:
    determining the recent activity level of the access terminal.

13. A wireless communications apparatus, comprising:
    a memory that stores data relating to a terminal for which the wireless communications apparatus serves as a data attachment point, wherein the memory further stores data indicating whether the terminal is within a coverage area associated with the data attachment point; and
    a processor configured to send a request from the data attachment point to an access gateway associated with the data attachment point to adaptively change a location at which data is buffered for the terminal based on whether the terminal is within the coverage area and based on recent activity level of the terminal, wherein the location at which the data is buffered for the terminal adaptively changes by instructing the access gateway to buffer data for the terminal upon determining that the terminal has moved outside the coverage area.

14. The wireless communications apparatus of claim 13, wherein a first registration radius corresponds to a coverage area of the wireless communications apparatus, wherein a second registration radius corresponds to an area larger than the coverage area of the wireless communications apparatus, and wherein a registration radius utilized by the terminal changes from the first registration radius to the second registration radius when the terminal moves outside the coverage area of the wireless communications apparatus.

15. The wireless communications apparatus of claim 14, wherein the wireless communications apparatus is configured to receive a registration signal in response to the terminal moving away from the coverage area of the wireless communications apparatus, and wherein the processor is further configured to determine a location of the terminal at least in part by determining whether the terminal has communicated a registration signal.

16. The wireless communications apparatus of claim 14, wherein the processor is further configured to receive data at the location from the access gateway for buffering and to instruct transmission of the data to the terminal when the terminal has not moved away from the coverage area of the wireless communications apparatus.

17. The wireless communications apparatus of claim 16, wherein the processor is further configured to determine whether the terminal is in an idle state and to page the terminal prior to instructing transmission of the data upon a determination that the terminal is in the idle state.

18. The wireless communications apparatus of claim 17, wherein the processor is configured to page the terminal at least in part by instructing communication of a paging request to a paging controller, receiving a paging response from the paging controller, and instructing transmission of a paging signal to the terminal.

19. The wireless communications apparatus of claim 13, wherein the processor is further configured to receive a notification from the access gateway that data is buffered for transmission to the terminal.

20. The wireless communications apparatus of claim 19, wherein the processor is further configured to initiate paging to facilitate location of an access network through which the access gateway can communicate the data to the terminal.

21. An apparatus that facilitates delay and backhaul-efficient paging and data communication in a wireless communication system, comprising:
means for determining whether a mobile terminal is within a coverage area associated with a data attachment point; and
means for selecting a location for buffering data for the mobile terminal based at least in part on whether the mobile terminal is within the coverage area and based on recent activity level of the mobile terminal by sending a request from the data attachment point to an access gateway associated with the data attachment point, wherein the means for selecting the location selects the location by instructing the access gateway to buffer data for the mobile terminal upon determining that the mobile terminal has moved outside the coverage area.

22. A non-transitory computer-readable medium, comprising:
code for causing a computer to determine whether a terminal in an idle state is within a coverage area associated with a data attachment point;
code for causing the computer to determine a location for buffering data for the terminal based on whether the terminal is within the coverage area and based on recent activity level of the terminal by sending a request from the data attachment point to an access gateway associated with the data attachment point, wherein the code for causing the computer to determine a location includes code for instructing the access gateway to buffer data for the terminal upon determining that the terminal has moved outside the coverage area;
code for causing the computer to cause the terminal to enter an active state; and
code for causing the computer to deliver buffered data to the terminal.

23. An integrated circuit that executes computer-executable instructions for coordinating communication of data to an access terminal in a wireless data network, wherein the instructions are executable to perform operations comprising:
determining whether the access terminal is within a coverage area associated with a data attachment point; and
modifying a location that buffers data for the access terminal based on whether the access terminal is within the coverage area and based on recent activity level of the access terminal by sending a request from the data attachment point to an access gateway associated with the data attachment point, wherein modifying the location at which the data is buffered for the access terminal includes instructing the access gateway to buffer data for the access terminal upon determining that the access terminal has moved outside the coverage area.

24. The method of claim 1, wherein the data is initially buffered at the access gateway, and wherein adaptively changing the location at which the data is buffered includes buffering data at an access network instead of at the access gateway.

25. The method of claim 24, wherein the access network includes a base station that includes a buffer configured to buffer the data.

26. The method of claim 25, wherein the access network is configured to serve as the data attachment point for the access terminal, and wherein the access gateway is configured to provide Internet Protocol (IP) connectivity to the access terminal.

27. The method of claim 1, wherein the data is initially buffered at an access network, and wherein adaptively changing the location at which the data is buffered includes buffering data at the access gateway instead of at the access network.

28. The method of claim 27, wherein the access network includes a base station that includes a buffer configured to buffer the data.

29. The method of claim 28, wherein the access network is configured to serve as the data attachment point for the access terminal, and wherein the access gateway is configured to provide Internet Protocol (IP) connectivity to the access terminal.

30. The method of claim 1, wherein the recent activity level of the access terminal corresponds to an idle state of the access terminal.

31. The method of claim 1, wherein the recent activity level of the access terminal corresponds to an active state of the access terminal.

32. The integrated circuit of claim 23, wherein the operations further comprise receiving a notification from the access gateway that data has been buffered by the access gateway for transmission to the access terminal.

33. The integrated circuit of claim 23, wherein the operations further comprise communicating a paging request to a session reference network controller (SRNC) to facilitate delivery of the buffered data from the access gateway to the access terminal using an access network that provides coverage for a location of the access terminal.

* * * * *